United States Patent
Wachi

(10) Patent No.: US 7,014,308 B2
(45) Date of Patent: Mar. 21, 2006

(54) INK SET FOR INKJET RECORDING AND INKJET RECORDING METHOD

(75) Inventor: Naotaka Wachi, Shizuoka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/404,435

(22) Filed: Apr. 2, 2003

(65) Prior Publication Data

US 2003/0210310 A1 Nov. 13, 2003

(30) Foreign Application Priority Data

Apr. 3, 2002 (JP) .................... P. 2002-101621

(51) Int. Cl.
*B41J 2/01* (2006.01)

(52) U.S. Cl. .............. 347/100; 347/95; 106/31.27

(58) Field of Classification Search ........... 347/100, 347/96, 95, 101; 106/31.13, 31.27, 31.6; 523/160
See application file for complete search history.

(56) References Cited

U.S. PATENT DOCUMENTS

| | | | |
|---|---|---|---|
| 4,923,515 A | | 5/1990 | Koike et al. |
| 5,199,956 A | * | 4/1993 | Schlenker et al. ............. 8/473 |
| 5,833,743 A | * | 11/1998 | Elwakil ................ 106/31.27 |
| 6,336,721 B1 | * | 1/2002 | Provost et al. .............. 347/100 |
| 6,592,212 B1 | * | 7/2003 | Kakutani ................... 347/100 |

FOREIGN PATENT DOCUMENTS

| | | |
|---|---|---|
| EP | 1 125 994 A1 | 8/2001 |
| EP | 1 182 050 A2 | 2/2002 |
| JP | 62-124166 A | 6/1987 |
| JP | 7-310037 A | 11/1995 |
| JP | 11-124526 A | 5/1999 |
| JP | 11-131000 A | 5/1999 |
| JP | 2000-94825 A | 4/2000 |
| JP | 2001-115071 A | 4/2001 |
| JP | 2001-199149 A | 7/2001 |
| JP | 2002-79695 A | 3/2002 |
| JP | 2002-211106 A | 7/2002 |
| JP | 2002-309155 A | 10/2002 |
| JP | 2002-309166 A | 10/2002 |
| JP | 2002-371079 A | 12/2002 |
| JP | 2002-371214 A | 12/2002 |
| WO | WO 95/27620 A1 | 10/1995 |

OTHER PUBLICATIONS

European Search Report dated Jul. 15, 2003.

* cited by examiner

*Primary Examiner*—Manish S. Shah
(74) *Attorney, Agent, or Firm*—Sughrue Mion, PLLC

(57) ABSTRACT

An ink set of a plurality of inks each including at least a dye, a water miscible organic solvent and water, wherein: (1) each of the water miscible organic solvents permits all of the dyes to have a solubility at 25° C. of less than 10 (g/100 g); or (2) at least one of the water miscible organic solvents permits at least one of the dyes to have a solubility at 25° C. of 10 (g/100 g) or greater, but a total amount of the at least one of the water miscible organic solvents is 10% by weight or less based on each one of the inks.

10 Claims, No Drawings

INK SET FOR INKJET RECORDING AND INKJET RECORDING METHOD

FIELD OF THE INVENTION

The present invention relates to an inkjet ink set composed of aqueous inks which is reduced in bleeding of an image, capable of providing an image of excellent quality, and excellent in handling ease and safety; and an inkjet recording method using it.

BACKGROUND OF THE INVENTION

With recent widespread use of computers, inkjet printers have come to be used not only at offices but also at home for printing images on paper, film or cloth.

Inkjet recording methods include a method of applying pressure by a piezo element, thereby discharging ink droplets, a method of generating air bubbles in an ink by heat, thereby discharging ink droplets, a method using ultrasonic waves, and a method of sucking and discharging ink droplets by making use of electrostatic force. As inks for such inkjet recording, aqueous inks, oil-based inks and solid (fusible type) inks are used. Of these, an aqueous ink is most popularly used in consideration of manufacturing ease, handling ease, odorlessness and safety.

A colorant to be incorporated in such inkjet recording inks is required to have high solubility in a solvent, permit high-density recording, have a good color hue, have excellent fastness to light, heat, air, water or chemicals, have good fixability to an ink absorbing material without bleeding, have excellent storage stability as an ink, be free from toxicity, have a high purity and be available at a low cost. Above all, as the electrical data capacitance of digital image becomes higher, there is an increase need for more precise and higher-quality image recording. To meet this need, it is necessary to form finer ink droplets and prevent spreading of ink droplets which have landed on a recording layer. Bleeding of a dye caused by spreading of ink droplets cannot be inhibited completely by an improvement in the recording layer. There is accordingly a strong demand for means capable of preventing bleeding of a dye contained in the ink solution by improving an ink or drawing method.

As means for preventing bleeding of a dye by improving an ink solution, various methods were tried including increase in the viscosity of the ink solution, use of a low diffusible and coarsened coloring material and incorporation of a mordant. By these methods, however, it is not impossible to prevent bleeding of an image and keep time-dependent stability of the ink solution or prevent clogging of a drawing nozzle at the same time.

Upon recording of a multicolor image, multicolor and/or multi-gradation image signals are output using an ink set having a series of inks different in color hue or density, or different in both of them. This case is however accompanied with such a drawback that when one of the inks tends to cause bleeding, it induces bleeding of another bleeding-free ink which is used in combination therewith. Compared with prevention of bleeding of an ink to be used alone, prevention of bleeding of an image recorded by an ink set is complicated and difficult so that no satisfactory solution has been found yet.

SUMMARY OF THE INVENTION

An object of the present invention is therefore to provide an inkjet ink set and inkjet recording method which cause less bleeding around thin lines or pixels of an image recorded using them and are therefore excellent in the quality of the recorded image.

Paying attention to the relationship between the composition of the solvent of each ink constituting the ink set and spreading of the ink droplets which have landed on a recording layer, the present inventors have carried out an extensive investigation. As a result, the above-described object can be accomplished by the inkjet ink sets as described below in 1) to 6) and the inkjet recording method as described below in 7) using any one of the inkjet ink sets.

1) An inkjet recording ink set comprising a plurality of different inks each containing at least a dye, a water miscible organic solvent (which is miscible with water) and water, wherein:

(1) any one of the water miscible organic solvents contained in the plurality of inks permits any dye in the plurality of inks to have a solubility at 25° C. of less than 10 (g/100 g); or (2) at least one of the water miscible organic solvents contained in the plurality of inks permits one of the dyes in the plurality of inks to have a solubility at 25° C. of 10 (g/100 g) or greater, but the total amount of the at least one of the water miscible organic solvents is 10 wt. % (% by weight) or less of an ink composition of any one of the inks constituting the ink set.

2) An inkjet recording ink set as described above in 1), which contains at least two water miscible organic solvents permitting one of the dyes contained in the plurality of inks to have a solubility at 25° C. of 10 (g/100 g) or greater.

3) An inkjet recording ink set as described above in 1) or 2), which comprises at least yellow, magenta and cyan inks.

4) An inkjet recording ink set as described above in any one of 1) to 3), which comprises at least yellow, magenta, cyan, and black inks.

5) An inkjet recording ink set as described above in any one of 1) to 4), which comprises at least yellow, dark yellow, magenta, light magenta, cyan, light cyan, and black inks.

6) An inkjet recording ink set as described above in any one of 1) to 5), wherein employed is at least a magenta dye represented by the following formula (1):

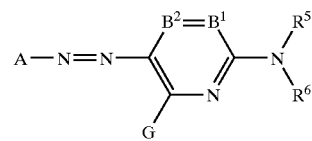

wherein, A represents a 5-membered heterocyclic group; $B^1$ and $B^2$ each represents $=CR^1-$ or $CR^2=$, or one of them represents a nitrogen atom, while the other represents $=CR^1-$ or $CR^2=$; $R^5$ and $R^6$ each independently represents a hydrogen atom or a substituent, the substituent means an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and the hydrogen atom of each substituent may be substituted; and G, $R^1$, and $R^2$ each independently represents a hydrogen atom or a substituent, the substituent means a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and the hydrogen atom of each substituent may be substituted; or $R^1$ and $R^5$, or $R^5$ and $R^6$ may be coupled to form a 5- or 6-membered ring.

7) An inkjet recording method which comprises using an inkjet ink set as described above in any one 1) to 6).

The present invention is characterized by that if there exists an ink, among the inks constituting the ink set, which contains a water miscible organic solvent permitting the dye, contained in any one of the constituent inks, to have a solubility of 10 or greater, the content of the water miscible organic solvent in any constituent ink is adjusted to 10 wt. % or less whether the constituent ink contains the dye or not. In other words, the content of the water miscible organic solvent permitting a high solubility of the dye is adjusted to 10 wt. % or less even if the constituent ink contains the dye or not, which effectively suppresses color bleeding from the dye-containing ink. The reason is not known, but it is presumed that when an ink containing a dye has landed adjacent to another ink not containing the dye but containing a water miscible organic solvent, the latter tends to accelerate the bleeding of the dye from the ink containing the dye, but the above-described adjustment can suppress this accelerating action.

When each ink constituting the ink set contains at least two water miscible organic solvents which permit a dye contained in the ink to have a solubility of 10 or greater, the total amount of the at least two organic solvents must be adjusted to 10 wt. % or less of the total amount of the ink composition.

DETAILED DESCRIPTION OF THE INVENTION

The present invention will hereinafter be described specifically.

An ink to be used for the ink set of the present invention is prepared by dissolving and/or dispersing a dye and preferably a surfactant in an aqueous medium composed of water and a water miscible organic solvent. Additives such as humectant, stabilizer, and antiseptic are added further to the ink composition as needed.

A plurality of inks different in density (absorbance), color hue or the like are necessary for drawing a multicolor or multi-gradation image while maintaining its quality. A group of these plurality of inks is called "ink set" simply.

A description will next be made of a water miscible organic solvent usable for the ink set of the present invention. In the present invention, it is possible to select any known water miscible solvent, depending on the properties of a nonvolatile ink component such as dye.

Examples of the water miscible organic solvent usable in the present invention include alcohols, polyhydric alcohols, glycol derivatives, amines and the other polar solvents.

More specifically, examples of the alcohols include methanol, ethanol, propanol, isopropanol, butanol, isobutanol, sec-butanol, t-butanol, pentanol, hexanol, cyclohexanol and benzyl alcohol; those of the polyhydric alcohols include ethylene glycol, diethylene glycol, triethylene glycol, polyethylene glycol, propylene glycol, dipropylene glycol, polypropylene glycol, butylene glycol, thiodiethylene glycol, tetraethylene glycol, 2-butene-1,4-diol, 1,3-butanediol, 1,5-pentanediol, 1,2-hexanediol, 2-methyl-2,4-pentanediol, hexanediol, pentanediol, glycerin, hexanetriol and thiodiglycol; those of the glycol derivatives include ethylene glycol monomethyl ether, ethylene glycol monoethyl ether, ethylene glycol monobutyl ether, ethylene glycol monoisobutyl ether, diethylene glycol monoisobutyl ether, diethylene glycol monomethyl ether, diethylene glycol monoethyl ether, diethylene glycol monobutyl ether, propylene glycol monomethyl ether, propylene glycol monobutyl ether, dipropylene glycol monomethyl ether, propylene glycol monopropyl ether, triethylene glycol monomethyl ether, triethylene glycol monobutyl ether, polyethylene glycol monomethyl ether, ethylene glycol diacetate, ethylene glycol monomethyl ether acetate, triethylene glycol monomethyl ether, triethylene glycol monoethyl ether, ethylene glycol monophenyl ether and ethylene glycol monoisopropyl ether; amines such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine; and those of the other polar solvents include formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone and diacetone alcohol.

Of these, glycol derivatives and alcohols are preferred as the solvent. The amount of such a water miscible organic solvent is selected in consideration of various factors of the resulting ink such as time-dependent stability, discharge stability and clogging prevention. More specifically, it is added preferably in an amount of 1 to 60 wt. %, especially preferably from 5 to 50 wt. % based on the total weight of the ink composition.

As the water miscible solvent, two or more solvents may be used in combination.

A description will next be made of a dye to be used for the ink set of the present invention.

The ink set of the present invention is applicable to any one of a combination of a plurality of inks different in color hue, a combination of a plurality of inks same in color hue but different in density, a combination of a plurality of inks different in both color hue and density. Of these, a combination of three inks, that is, cyan, yellow and magenta, a combination of four inks, that is, cyan, yellow magenta and black, and such a combination including an ink composed of at least two kinds different in density (or absorbance), that is, a high-density one and a low-density one are preferred. Above all, an ink set using seven inks, that is, light cyan, cyan, light magenta, magenta, yellow, dark yellow and black, in combination is particularly suited for drawing a high quality full color image, because it has excellent color reproducibility and gradation reproducibility.

Cyan, yellow, magenta and black dyes selected widely from known ones can be used in combination. Examples of the dyes usable in the present invention will next be described.

Examples of the yellow dye include aryl or heterylazo dyes having, as a coupling component, a phenol, naphthol, aniline, pyrazolone, pyridone, or open-chain type active methylene compound; azomethine dyes having an openchain active methylene compound as a coupling component; methine dyes such as benzylidene and monomethineoxonol dyes; quinone dyes such as naphthoquinone and anthraquinone dyes; and the other dyes such as quinophthalone, nitro•nitroso, acridine and acridinone dyes. These dyes may assume a yellow color for the first time after dissociation of a portion of its chromophore. In this case, a counter cation may be either an inorganic cation such as alkali metal or ammonium or an organic cation such as pyridinium or quaternary ammonium salt. Alternatively, it may be a polymer cation having, in a partial structure thereof, such a cation.

Examples of the magenta dye include aryl or heterylazo dyes having a phenol, naphthol or aniline as a coupling component; azomethine dyes having a pyrazolone or pyrazolotriazole as a coupling component; methine dyes such as arylidene, styryl, merocyanine, and oxonol dyes; carbonium dyes such as diphenylmethane, triphenylmethane and xanthene dyes; quinone dyes such as naphthoquinone, anthraquinone and anthrapyridone dyes; and condensed polycyclic dyes such as dioxazine dyes. These dyes may assume a magenta color for the first time after dissociation of a portion of its chromophore. In this case, a counter cation may be either an inorganic cation such as alkali metal or ammonium or an organic cation such as pyridinium or quaternary ammonium salt. Alternatively, it may be a polymer cation having, in the partial structure thereof, such a cation.

Examples of the cyan dye include azomethine dyes such as indoaniline and indophenol dyes; polymethine dyes such as cyanine, oxonol and merocyanine dyes; carbonium dyes such as diphenylmethane, triphenylmethane and xanthene dyes; phthalocyanine dyes; anthraquinone dyes; aryl or heterylazo dyes having a phenol, naphthol or aniline as a coupling component; and indigo•thioindigo dyes. These dyes may assume a cyan color for the first time after dissociation of a portion of its chromophore. In this case, a counter cation may be either an inorganic cation such as alkali metal or ammonium or an organic cation such as pyridinium or quaternary ammonium salt. Alternatively, it may be a polymer cation having, in a partial structure thereof, such a cation.

Black dyes such as polyazo dyes are also usable.

As water soluble dyes, direct dyes, acid dyes, food dyes, basic dyes, and reactive dyes are usable. Preferred are:

C.I. Direct Reds 2, 4, 9, 23, 26, 31, 39, 62, 63, 72, 75, 76, 79, 80, 81, 83, 84, 89, 92, 95, 111, 173, 184, 207, 211, 212, 214, 218, 223, 224, 225, 226, 227, 232, 233, 240, 241, 242, 243, and 247;

C.I. Direct Violets 7, 9, 47, 48, 51, 66, 90, 93, 94, 95, 98, 100 and 101;

C.I. Direct Yellows 8, 9, 11, 12, 27, 28, 29, 33, 35, 39, 41, 44, 50, 53, 59, 68, 86, 87, 93, 95, 96, 98, 100, 106, 108, 109, 110, 130, 132, 142, 144, 161 and 163;

C.I. Direct Blues 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291;

C.I. Direct Blacks 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199;

C.I. Acid Reds 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397;

C.I. Acid Violets 5, 34, 43, 47, 48, 90, 103 and 126;

C.I. Acid Yellows 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227;

C.I. Acid Blues 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290 and 326;

C.I. Acid Blacks 7, 24, 29, 48, 52:1 and 172;

C.I. Reactive Red 3, 13, 17, 19, 21, 22, 23, 24, 29, 35, 37, 40, 41, 43, 45, 49 and 55;

C.I. Reactive Violets 1, 3, 4, 5, 6, 7, 8, 9, 16, 17, 22, 23, 24, 26, 27, 33 and 34;

C.I. Reactive Yellows 2, 3, 13, 14, 15, 17, 18, 23, 24, 25, 26, 27, 29, 35, 37, 41 and 42;

C.I. Reactive Blues 2, 3, 5, 8, 10, 13, 14, 15, 17, 18, 19, 21, 25, 26, 27, 28, 29 and 38;

C.I. Reactive Blacks 4, 5, 8, 14, 21, 23, 26, 31, 32 and 34;

C.I. Basic Reds 12, 13, 14, 15, 18, 22, 23, 24, 25, 27, 29, 35, 36, 38, 39, 45 and 46;

C.I. Basic Violets 1, 2, 3, 7, 10, 15, 16, 20, 21, 25, 27, 28, 35, 37, 39, 40 and 48;

C.I. Basic Yellows 1, 2, 4, 11, 13, 14, 15, 19, 21, 23, 24, 25, 28, 29, 32, 36, 39 and 40;

C.I. Basic Blues 1, 3, 5, 7, 9, 22, 26, 41, 45, 46, 47, 54, 57, 60, 62, 65, 66, 69 and 71; and C.I. Basic black 8.

In the present invention, use of an azo dye represented by the below-described formula (1) as the magenta dye is particularly preferred. The dye represented by the formula (1) is an azo dye having an aromatic nitrogenous 6-membered heterocycle as a coupling component, having excellent image fastness with strong resistance against light, heat and oxidizing atmosphere, and having stability as an aqueous ink which can adopt, as a solvent, water and many water miscible organic solvents.

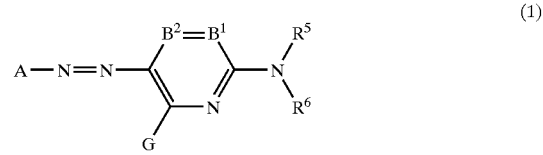

In the formula (1), A represents a 5-membered heterocyclic group.

$B^1$ and $B^2$ each represents $=CR^1-$ or $CR^2=$, or one of them represents a nitrogen atom, while the other represents $=CR^1-$ or $CR^2=$. $R^5$ and $R^6$ each independently represents a hydrogen atom or a substituent and the substituent means an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group and the hydrogen atom of each substituent may be substituted.

G, $R^1$, and $R^2$ each independently represents a hydrogen atom or a substituent and this substituent means a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group. The hydrogen atom of each substituent may be substituted.

$R^1$ and $R^5$, or $R^5$ and $R^6$ may be coupled to form a 5- or 6-membered ring.

The dye of the formula (1) will next be described more specifically.

In the formula (1), A represents a 5-membered heterocyclic group. Examples of the hetero atom of the heterocycle include N, O and S. The 5-membered heterocyclic group is preferably a nitrogenous 5-membered heterocycle and the heterocycle may be condensed with an aliphatic ring, an aromatic ring or another heterocycle. Preferred examples of the heterocycle as A include pyrazole ring, imidazole ring, thiazole ring, isothiazole ring, thiadiazole ring, benzothiazole ring, benzoxazole ring and benzoisothiazole ring. Each of these heterocyclic groups may have a substituent further. Of these, the pyrazole ring, imidazole ring, isothiazole ring, thiadiazole ring and benzothiazole ring represented by the below-described formulas (a) to (f) are preferred.

(a) 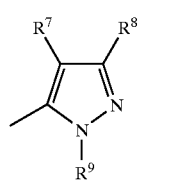

(b) 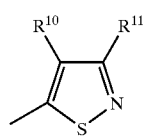

(c) 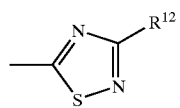

(d) 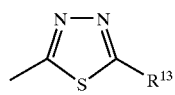

(e) 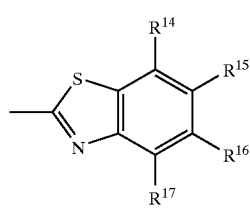

(f) 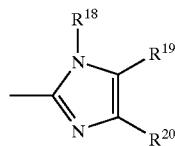

In the above-described formulas (a) to (f), $R^7$ to $R^{20}$ represent similar substituents to those described in G, $R^1$ and $R^2$ of the formula (1).

Of the formulas (a) to (f), preferred are pyrazole and isothiazole rings represented by the formulas (a) and (b), with the pyrazole ring of the formula (a) being most preferred.

In the formula (1), $B^1$ and $B^2$ each represents =$CR^1$— and —$CR^2$=, or one of them represents a nitrogen atom and the other one represents =$CR^1$— or —$CR^2$=, of which the former one is preferred.

$R^5$ and $R^6$ each independently represents a hydrogen atom or a substituent. The substituent means an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and the hydrogen atom of each of these substituents may be substituted further.

Preferred examples of $R^5$ or $R^6$ include a hydrogen atom, aliphatic groups, aromatic groups, heterocyclic groups, acyl groups, and alkyl- or arylsulfonyl groups. Of these, a hydrogen atom, aromatic groups, heterocyclic groups, acyl groups, and alkyl- or aryl-sulfonyl groups are more preferred, with a hydrogen atom, aryl groups and heterocyclic groups being most preferred. The hydrogen atom of each of these substituents may be substituted further. $R^5$ and $R^6$ however do not represent a hydrogen atom simultaneously.

G, $R^1$ and $R^2$ each independently represents a hydrogen atom or a substituent and the substituent means a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, an ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group. The hydrogen atom of each of these substituents may be substituted further.

Preferred examples of G include a hydrogen atom, halogen atoms, aliphatic groups, aromatic groups, a hydroxy group, alkoxy groups, aryloxy groups, acyloxy groups, heterocyclic oxy groups, amino groups, acylamino groups, a ureido group, a sulfamoylamino group, alkoxycarbonylamino groups, aryloxycarbonylamino groups, alkyl- and aryl-thio groups, and heterocyclic thio groups, of which a hydrogen atom, halogen atoms, alkyl groups, a hydroxy group, alkoxy groups, aryloxy groups, acyloxy groups, amino groups, and acylamino groups are preferred, with a hydrogen atom, amino groups (preferably, an anilino group), and acylamino groups being most preferred. The hydrogen atom of each of these substituents may be substituted further.

Preferred examples of $R^1$ or $R^2$ include a hydrogen atom, alkyl groups, halogen atoms, alkoxycarbonyl groups, a carboxyl group, a carbamoyl group, a hydroxy group, alkoxy groups, and a cyano group. The hydrogen atom of each of these substituents may be substituted further.

$R^1$ and $R^5$, or $R^5$ and $R^6$ may be coupled to form a 5- or 6-membered ring.

When A has a substituent or the substituent of $R^1$, $R^2$, $R^5$, $R^6$ or G has a substituent further, substituents as described above in G, $R^1$ and $R^2$ can be given as examples.

When the dye of the formula (1) is a water soluble dye, it has preferably, as a substituent, an ionic hydrophilic group on any one position of A, $R^1$, $R^2$, $R^5$, $R^6$ and G. Examples of the ionic hydrophilic group as a substituent include a sulfo group, carboxyl group, phosphono group, and quaternary ammonium groups. As the ionic hydrophilic group, carboxyl, phosphono and sulfo groups are preferred, with carboxyl and sulfo groups being especially preferred. The carboxyl, phosphono and sulfo groups may be in the form of a salt. Examples of the counterion which forms its salt include ammonium ion, alkali metal ions (ex. lithium ion, sodium ion and potassium ion) and organic cations (ex. tetramethylammonium ion, tetramethylguanidium ion and tetramethylphosphonium).

Next, the terms as used herein with regards to the substituents will hereinafter be described. The meaning of each of these terms is common to the formula (1) and formula (2) though the reference symbols are different.

Examples of the halogen atom include fluorine, chlorine and bromine atoms.

The term "aliphatic group" means an alkyl group, a substituted alkyl group, an alkenyl group, a substituted alkenyl group, an alkynyl group, a substituted alkynyl group, an aralkyl group and a substituted aralkyl group. The term "substituted" used for "substituted alkyl group" or the like as used herein means that the hydrogen atom existing in the "alkyl group" or the like is substituted by the substituent exemplified above in G, $R^1$ and $R^2$.

The aliphatic group may be branched or may form a ring. The aliphatic group has preferably 1 to 20, more preferably 1 to 16 carbon atoms. The aryl portion of the aralkyl or substituted aralkyl group is preferably a phenyl or naphthyl group, with a phenyl group being especially preferred. Examples of the aliphatic group include methyl, ethyl, butyl, isopropyl, t-butyl, hydroxyethyl, methoxyethyl, cyanoethyl, trifluoromethyl, 3-sulfopropyl, 4-sulfobutyl, cyclohexyl, benzyl, 2-phenethyl, vinyl and allyl.

The term "aromatic group" means an aryl group and a substituted aryl group. As the aryl group, a phenyl or naphthyl group is preferred, with a phenyl group being especially preferred. The aromatic group has preferably 6 to 20, more preferably 6 to 16 carbon atoms.

Examples of the aromatic group include phenyl, p-tolyl, p-methoxyphenyl, o-chlorophenyl and m-(3-sulfopropylamino)phenyl.

The term "heterocyclic group" includes a substituted heterocyclic group. The heterocyclic group may have a heterocycle condensed with an aliphatic ring, aromatic ring or another heterocycle. As the heterocyclic group, a 5- or 6-membered heterocyclic group is preferred. Examples of the substituent include aliphatic groups, halogen atoms, alkylsulfonyl groups, arylsulfonyl groups, acyl groups, acylamino groups, sulfamoyl group, carbamoyl group and ionic hydrophilic groups. Examples of the heterocyclic group include 2-pyridyl, 2-thienyl, 2-thiazolyl, 2-benzothiazolyl, 2-benzoxazolyl and 2-furyl.

The term "carbamoyl group" includes a substituted carbamoyl group. Examples of the substituent for it include alkyl groups. Examples of the carbamoyl group include methylcarbamoyl and dimethylcarbamoyl.

The term "alkoxycarbonyl group" includes a substituted alkoxycarbonyl group. As the alkoxycarbonyl group, alkoxycarbonyl groups having 2 to 20 carbon atoms are preferred. Examples of the substituent include ionic hydrophilic groups. Examples of the alkoxycarbonyl group include methoxycarbonyl and ethoxycarbonyl.

The term "aryloxycarbonyl group" includes a substituted aryloxycarbonyl group. The aryloxycarbonyl group has preferably 7 to 12 carbon atoms. Examples of the substituent include ionic hydrophilic groups. Examples of the aryloxycarbonyl group include phenoxycarbonyl.

The term "heterocyclic oxycarbonyl group" includes a substituted heterocyclic oxycarbonyl group. As the heterocycle, those described above in the heterocyclic group can be given as examples. The heterocyclic oxycarbonyl group has preferably 2 to 20 carbon atoms. Examples of the substituent include ionic hydrophilic groups. Examples of the heterocyclic oxycarbonyl group include 2-pyridyloxycarbonyl.

The term "acyl group" includes a substituted acyl group. The acyl group has preferably 1 to 20 carbon atoms. Examples of the substituent include ionic hydrophilic groups. Examples of the acyl group include acetyl and benzoyl.

The term "alkoxy group" includes a substituted alkoxy group. As the alkoxy group, that having 1 to 20 carbon atoms is preferred. Examples of the substituent include alkoxy groups, hydroxyl group, and ionic hydrophilic groups. Examples of the alkoxy group include methoxy, ethoxy, isopropoxy, methoxyethoxy, hydroxyethoxy and 3-carboxypropoxy.

The term "aryloxy group" includes a substituted aryloxy group. As the aryloxy group, that having 6 to 20 carbon atoms is preferred. Examples of the substituent include alkoxy groups and ionic hydrophilic groups. Examples of the aryloxy group include phenoxy, p-methoxyphenoxy and o-methoxyphenoxy.

The term "heterocyclic oxy group" includes a substituted heterocyclic oxy group. As the heterocycle, those described above in the heterocyclic group can be given as examples. The heterocyclic oxy group has preferably 2 to 20 carbon atoms. Examples of the substituent include alkyl, alkoxy and ionic hydrophilic groups. Examples of the heterocyclic oxy group include 3-pyridyloxy and 3-thienyloxy.

As the silyloxy group, that substituted with a $C_{1-20}$ aliphatic or aromatic group is preferred. Examples of the silyloxy group include trimethylsilyloxy and diphenylmethylsilyloxy.

The term "acyloxy group" includes a substituted acyloxy group. The acyloxy group has preferably 1 to 20 carbon atoms. Examples of the substituent include ionic hydrophilic groups. Examples of the acyloxy group include acetoxy and benzoyloxy.

The term "carbamoyloxy group" includes a substituted carbamoyloxy group. Examples of the substituent include alkyl groups. Examples of the carbamoyloxy group include N-methylcarbamoyloxy group.

The term "alkoxycarbonyloxy group" includes a substituted alkoxycarbonyloxy group. The alkoxycarbonyloxy group has preferably 2 to 20 carbon atoms. Examples of the alkoxycarbonyloxy group include methoxycarbonyloxy and isopropoxycarbonyloxy.

The term "aryloxycarbonyloxy group" includes a substituted aryloxycarbonyloxy group. The aryloxycarbonyloxy group has preferably 7 to 20 carbon atoms. Examples of the aryloxycarbonyloxy group include phenoxycarbonyloxy.

The term "amino group" includes a substituted amino group. Examples of the substituent include alkyl, aryl and heterocyclic groups. The alkyl groups, aryl groups and heterocyclic groups may be substituted further. The term "alkylamino group" includes a substituted alkylamino group. The alkylamino group preferably has 1 to 20 carbon atoms. Examples of the substituent include ionic hydrophilic groups. Examples of the alkylamino groups include methylamino and diethylamino.

The term "arylamino group" includes a substituted arylamino group. The arylamino group preferably has 6 to 20 carbon atoms. Examples of the substituents include halogen atoms and ionic hydrophilic groups. Examples of the arylamino groups include phenylamino and 2-chlorophenylamino.

The term "heterocyclic amino group" includes a substituted heterocyclic amino group. As the heterocycle, those described above in the heterocyclic group can be given as examples. As the heterocyclic amino group, heterocyclic amino groups having 2 to 20 carbon atoms are preferred. Examples of the substituent include alkyl groups, halogen atoms and ionic hydrophilic groups.

The term "acylamino group" includes a substituted acylamino group. The acylamino group has preferably 2 to 20 carbon atoms. Examples of the substituent include ionic hydrophilic groups. Examples of the acylamino group include acetylamino, propionylamino, benzoylamino, N-phenylacetylamino and 3,5-disulfobenzoylamino.

The term "ureido group" includes a substituted ureido group. The ureido group has preferably 1 to 20 carbon atoms. Examples of the substituent include alkyl and aryl groups. Examples of the ureido group include 3-methylureido, 3,3-dimethylureido and 3-phenylureido.

The term "sulfamoylamino group" includes a substituted sulfamoylamino group. Examples of the substituent include alkyl groups. Examples of the sulfamoylamino group include N,N-dipropylsulfamoylamino.

The term "alkoxycarbonylamino group" includes a substituted alkoxycarbonylamino group. The alkoxycarbonylamino group has preferably 2 to 20 carbon atoms. Examples of the substituent include ionic hydrophilic groups. Examples of the alkoxycarbonylamino group include ethoxycarbonylamino group.

The term "aryloxycarbonylamino group" includes a substituted aryloxycarbonylamino group. The aryloxycarbonylamino group has preferably 7 to 20 carbon atoms. Examples of the substituent include ionic hydrophilic groups. Examples of the aryloxycarbonylamino group include phenoxycarbonylamino group.

The terms "alkylsulfonylamino group" and "arylsulfonylamino group" include a substituted alkylsulfonylamino group and a substituted arylsulfonylamino group. Each of the alkylsulfonylamino group and arylsulfonylamino group has preferably 1 to 20 carbon atoms. Examples of the substituent include ionic hydrophilic groups. Examples of the alkylsulfonylamino group and the arylsulfonylamino group include methylsulfonylamino, N-phenyl-methylsulfonylamino, phenylsulfonylamino and 3-carboxybenzenesulfonylamino.

The term "heterocyclic sulfonylamino group" includes a substituted heterocyclic sulfonylamino group. As the heterocycle, those described above in the heterocyclic group can be given as examples. The heterocyclic sulfonylamino group has preferably 1 to 12 carbon atoms. Examples of the substituent include ionic hydrophilic groups. Examples of the heterocyclic sulfonylamino group include 2-thienylsulfonylamino and 3-pyridinesulfonylamino.

The terms "alkylthio group", "arylthio group" and "heterocyclic thio group" include substituted alkylthio, substituted arylthio and substituted heterocyclic thio groups, respectively. As the heterocycle, those described above in the heterocyclic group can be given as examples. The alkylthio, arylthio and heterocyclic thio groups each preferably has 1 to 20 carbon atoms. Examples of the substituent include ionic hydrophilic groups. Examples of the alkylthio, arylthio and heterocyclic thio groups include methylthio, phenylthio and 2-pyridylthio groups.

The term "alkylsulfonyl group" and "arylsulfonyl group" include substituted alkylsulfonyl and substituted arylsulfonyl groups. Examples of the alkylsulfonyl and arylsulfonyl groups include methylsulfonyl and phenylsulfonyl, respectively.

The term "heterocyclic sulfonyl group" includes a substituted heterocyclic sulfonyl group. As the heterocycle, those described above in the heterocyclic group can be given as examples. The heterocyclic sulfonyl group has preferably 1 to 20 carbon atoms. Examples of the substituent include ionic hydrophilic groups. Examples of the heterocyclic sulfonyl group include 2-thienylsulfonyl and 3-pyridylsulfonyl.

The terms "alkylsulfinyl group" and "arylsulfinyl group" include substituted alkylsulfinyl and substituted arylsulfinyl groups. Examples of the alkylsulfinyl and arylsulfinyl groups include methylsulfinyl and phenylsulfinyl groups, respectively.

The term "heterocyclic sulfinyl group" includes a substituted heterocyclic sulfinyl group. As the heterocycle, those described above in the heterocyclic group can be given as examples. The heterocyclic sulfinyl group has preferably 1 to 20 carbon atoms. Examples of the substituent include ionic hydrophilic groups. Examples of the heterocyclic sulfinyl group include 4-pyridylsulfinyl group.

The term "sulfamoyl group" includes a substituted sulfamoyl group. Examples of the substituent include alkyl groups. Examples of the sulfamoyl group include dimethylsulfamoyl and di-(2-hydroxyethyl)sulfamoyl.

The dye of the formula (1) to be used for the ink set of the present invention is particularly preferred when it has a structure represented by the following formula (2):

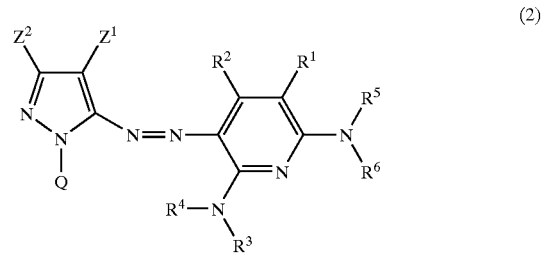

(2)

In the formula, $R^1$, $R^2$, $R^5$ and $R^6$ have the same meanings as described in the formula (1).

$R^3$ and $R^4$ each independently represents a hydrogen atom or a substituent and the substituent means an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group. Of these, a hydrogen atom, an aromatic group, a heterocyclic group, an acyl group, an alkylsulfonyl group or an arylsulfonyl group is preferred, with a hydrogen atom, an aromatic group or a heterocyclic group being especially preferred.

$Z^1$ represents an electron attractive group having a Hammett substituent constant δp of 0.20 or greater. $Z^1$ is preferably an electron attractive group having δp of 0.30 or greater, more preferably 0.45 or greater, especially 0.60 or greater. The constant δp not exceeding 1.0 is however desired. Preferred specific examples of the substituent include electron attractive substituents which will be described later. Of these, preferred are $C_{2-20}$ acyl groups, $C_{2-20}$ alkyloxycarbonyl groups, nitro group, cyano group, $C_{1-20}$ alkylsulfonyl groups, $C_{6-20}$ arylsulfonyl groups, $C_{1-20}$ carbamoyl groups, and $C_{1-20}$ alkyl halide groups, of which cyano group, $C_{1-20}$ alkylsulfonyl groups, and $C_{6-20}$ arylsulfonyl groups are especially preferred, with cyano group being most preferred.

$Z^2$ represents a hydrogen atom or a substituent and the substituent means an aliphatic group, an aromatic group or a heterocyclic group. $Z^2$ is preferably an aliphatic group, with a $C_{1-6}$ alkyl group being more preferred.

Q represents a hydrogen atom or a substituent and the substituent means an aliphatic group, an aromatic group or a heterocyclic group. As Q, a group made of a nonmetal atomic group necessary for forming a 5- to 8-membered ring is preferred. The 5- to 8-membered ring may be substituted, be saturated or have an unsaturated bond. Of these, an aromatic group and a heterocyclic group are especially preferred. Preferred examples of the nonmetal atom include nitrogen atom, oxygen atom, sulfur atom and carbon atom. Specific examples of such a cyclic structure include benzene, cyclopentane, cyclohexane, cycloheptane, cyclooctane, cyclohexene, pyridine, pyrimidine, pyrazine, pyridazine, triazine, imidazole, benzimidazole, oxazole, benzoxazole, thiazole, benzothiazole, oxane, sulfolane and thiane rings.

The hydrogen atom of each substituent described with regards to the formula (2) may be substituted. Examples of the substituent include those described in the formula (1), those exemplified in G, $R^1$ and $R^2$ and ionic hydrophilic groups.

A description will next be made of a Hammett substituent constant δp value used herein. The Hammett rule is an empirical rule suggested by L. P. Hammett in 1935 in order to deal quantitatively with the influence of substituents on reactions or equilibria of benzene derivatives, and nowadays its validity is widely accepted. The substituent constants determined by the Hammett rule include δp values and δm values, many of which are described in general books and are described in detail, for example, in *Lange's Handbook of Chemistry*, 12th edition, ed. by J. A. Dean, published in 1979 (McGraw-Hill), and in *Journal of Japanese Chemistry*, Extra Number, No. 122, pages 96 to 103, 1979 (Nankodo Co., Ltd.). In the present invention, each substituent is limited or explained by the Hammett substituent constant δp values. It is however needless to say that substituents are not limited only to those having values found in these books and known in the literature but rather substituents whose Hammett substituent constant δp values are not known in the literature but when measured in accordance with the Hammett rule, will fall within its range. The compounds represented by the formulas (2) of the invention include compounds which are not benzene derivatives, but δp values are used as a measure for indicating electron effects of the substituent irrespective of the position of the substituent. In the invention, δp values are used in this sense.

Examples of electron attractive groups having an Hammett substituent constant δp value of 0.60 or greater include cyano group, nitro group, alkylsulfonyl groups (such as methanesulfonyl) and arylsulfonyl groups (such as phenylsulfonyl).

Examples of electron attractive groups having an Hammett substituent constant δp value of 0.45 or greater include acyl groups (such as acetyl), alkoxycarbonyl groups (such as dodecyloxycarbonyl), aryloxycarbonyl groups (such as m-chlorophenoxycarbonyl), alkylsulfinyl groups (such as n-propylsulfinyl), arylsulfinyl groups (ex. phenylsulfinyl), sulfamoyl groups (such as N-ethylsulfamoyl and N,N-dimethylsulfamoyl), and alkyl halide groups (such as trifluoromethyl).

Examples of the electron attractive groups with a Hammett substituent constant δp value of 0.30 or greater include, in addition to the above-described groups, acyloxy groups (such as acetoxy), carbamoyl groups (such as N-ethylcarbamoyl and N,N-dibutylcarbamoyl), halogenated alkoxy groups (such as trifluoromethyloxy), halogenated aryloxy groups (such as pentafluorophenyloxy), sulfonyloxy groups (ex. methylsulfonyloxy), halogenated alkylthio groups (such as difluoromethylthio), aryl groups substituted with at least two electron attractive groups having a δp value of 0.15 or greater (such as 2,4-dinitrophenyl and pentachlorophenyl) and heterocycles (such as 2-benzoxazolyl, 1-benzothiazolyl and 1-phenyl-2-benzimidazolyl).

Specific examples of the electron attractive group having a δp value of 0.20 or greater include, in addition to the above-described ones, halogen atoms.

The azo dyes of the formula (1) having, as each of $R^5$ and $R^6$, a hydrogen atom, an alkyl group, an aryl group, a heterocyclic group, a sulfonyl group or an acyl group are particularly preferred, with those having a hydrogen atom, an aryl group, a heterocyclic group or a sulfonyl group being more preferred and a hydrogen atom, an aryl group or a heterocyclic group being most preferred. $R^5$ and $R^6$ however do not represent a hydrogen atom at the same time.

As G, preferred are a hydrogen atom, halogen atoms, alkyl groups, a hydroxyl group, an amino group and acylamino groups, of which a hydrogen atom, halogen atoms, an amino group and acylamino groups are more preferred, with a hydrogen atom, an amino group and acylamino groups being still more preferred.

As A, preferred are pyrazole, imidazole, isothiazole, thiadiazole and benzothiazole rings, of which pyrazole and isothiazole rings are more preferred, with pyrazole ring being most preferred.

Preferred as $B^1$ and $B^2$ are $=CR^1-$ and $-CR^2=$, respectively. As each of $R^1$ and $R^2$, a hydrogen atom, an alkyl group, a halogen atom, a cyano group, a carbamoyl group, a carboxyl group, an alkyl group, a hydroxy group, an alkoxy group or an alkoxycarbonyl group is preferred, with a hydrogen atom, an alkyl group, a carboxyl group, a cyano group, or a carbamoyl group being more preferred.

As the compound of the formula (1), those having, as at least one of the substituents, the above-described preferred group are preferred, of which those having, as more substituents, the above-described preferred groups are more preferred, with those having, as all the substituents, the above-described preferred groups being most preferred.

Specific examples of the azo dye represented by the formula (1) will be described below, but azo dyes used in the invention are not limited thereto.

TABLE 1

| Dye | R₁ | R₂ | R₃ |
|-----|----|----|----|
| a-1 | 2-benzothiazolyl | 4-C₈H₁₇-phenyl | 4-C₈H₁₇-phenyl |
| a-2 | 5-chloro-2-benzothiazolyl | 4-C₈H₁₇-phenyl | 2,4,6-trimethylphenyl |
| a-3 | 6-chloro-2-benzothiazolyl | 2,4,6-trimethylphenyl | 4-C₈H₁₇-phenyl |
| a-4 | 2-benzothiazolyl | 2-(OC₈H₁₇)phenyl | 4-C₈H₁₇-phenyl |
| a-5 | 5-nitro-2-benzothiazolyl | 2,4-dimethylphenyl | 2,4-dimethylphenyl |

TABLE 2

| Dye | R₁ | R₂ | R₃ |
|---|---|---|---|
| a-6 | 2-methylbenzothiazol-6-yl-SO₂NH-(CH₂)₃-O-(2,4-di-tert-amylphenyl) | 4-methylphenyl | 4-methylphenyl |
| a-7 | 2-methylbenzothiazol-6-yl-SO₂NH-(CH₂)₃-OCH₂CH(C₈H₁₃)₂ | 2,3,5-trimethylphenyl | 4-methylphenyl |
| a-8 | 2-methylbenzothiazol-6-yl-NHCOCH(Et)-O-(2,4-di-tert-amylphenyl) | 4-C₈H₁₇-phenyl | 4-C₈H₁₇-phenyl |
| a-9 | 2-methylbenzothiazol-6-yl-NHSO₂-(2-(n)C₈H₁₇O-5-C₈H₁₇(t)-phenyl) | 2,3,5-trimethylphenyl | 4-C₈H₁₇(t)-phenyl |
| a-10 | 2-methyl-5-chlorobenzothiazol-6-yl | 2-OC₁₂H₂₅-phenyl | 2-OC₁₂H₂₅-phenyl |

TABLE 3

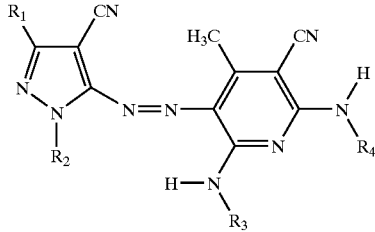

| Dye | R₁ | R₂ | R₃ | R₄ |
|---|---|---|---|---|
| a-11 | *tert*-butyl | 2-(6-SO₂Na)benzothiazolyl | 4-methylphenyl | 4-SO₃Na-phenyl |
| a-12 | phenyl | 2-(6-COOH)benzothiazolyl | 4-SO₃K-phenyl | 3-COOH-phenyl |
| a-13 | 2-chloro-6-methylphenyl | 2-(SO₃K)benzothiazolyl (4,5-mix) | 4-SO₃K-phenyl | 3-COOH-phenyl |
| a-14 | *tert*-butyl | 2-(6-SO₃Na)benzothiazolyl | 2,4,6-trimethyl-3-SO₃Na-phenyl | 2,4,6-trimethyl-3-SO₃Na-phenyl |
| a-15 | *tert*-butyl | 2-(6-SO₃K)benzothiazolyl | 2,4,6-trimethyl-3-SO₃K-phenyl | 2,4,6-trimethyl-3-SO₃K-phenyl |
| a-16 | *tert*-butyl | 2-(6-Cl)benzothiazolyl | 3,5-dimethyl-4-CH₂N(CH₂CO₂H)₂-phenyl | 3,5-dimethyl-4-CH₂N(CH₂CO₂H)₂-phenyl |
| a-17 | *tert*-butyl | 2-(6-SO₃Na)benzothiazolyl | 3,5-dimethyl-4-SO₃Na-phenyl | 3,5-dimethyl-4-SO₃Na-phenyl |

TABLE 4
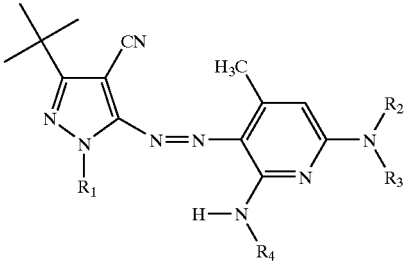
| Dye | R₁ | R₂ | R₃ | R₄ |
|---|---|---|---|---|
| a-18 | 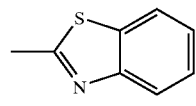 | 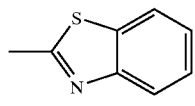 | 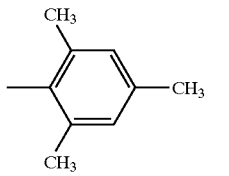 | 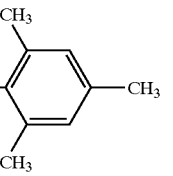 |
| a-19 | 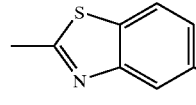 | —SO$_2$CH$_3$ | 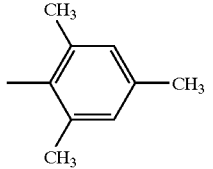 | 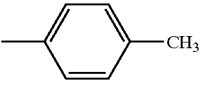 |
| a-20 | 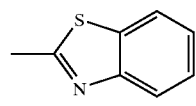 | —COCH$_3$ | C$_8$H$_{17}$(t) | C$_8$H$_{17}$(t) |
| a-21 | 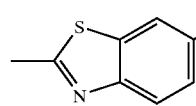 | —SO$_2$CH$_3$ | 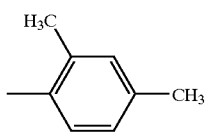 | C$_8$H$_{17}$(t) |

TABLE 4-continued
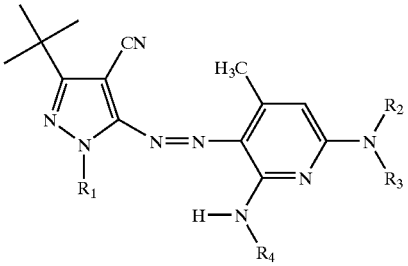
| Dye | R₁ | R₂ | R₃ | R₄ |
|---|---|---|---|---|
| a-22 | 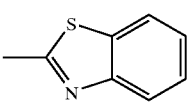 | H | 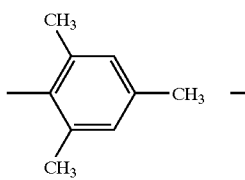 | 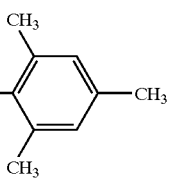 |
| a-23 | 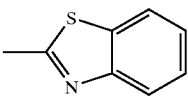 | H | 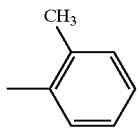 | 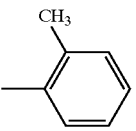 |
| a-24 | 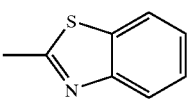 | H | 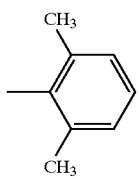 | 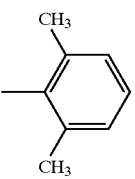 |
| a-25 | 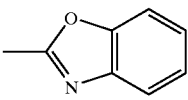 | 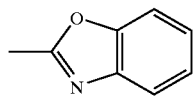 | 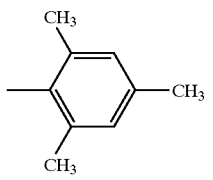 | 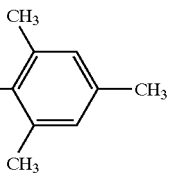 |

TABLE 5
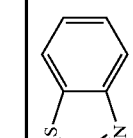

TABLE 5-continued
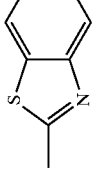

TABLE 6
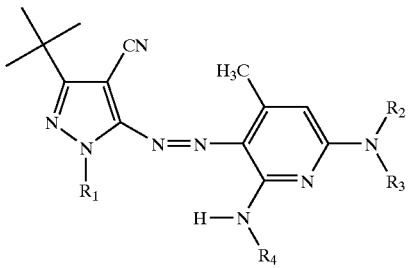
| Dye | R₁ | R₂ | R₃ | R₄ |
|---|---|---|---|---|
| a-32 | 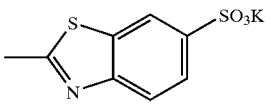 | 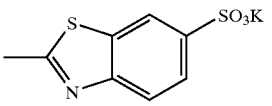 | 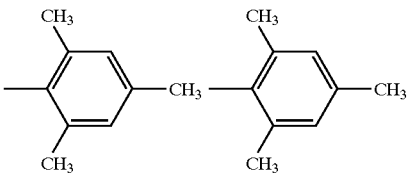 | 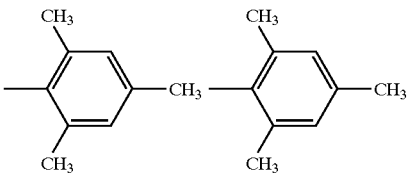 |
| a-33 | 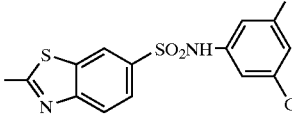 | 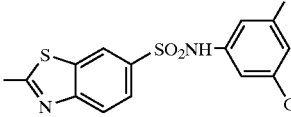 | 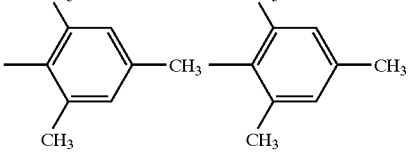 | 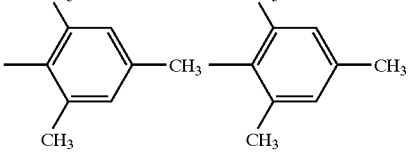 |
| a-34 | 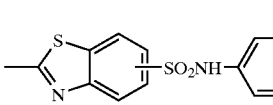 (5, 6-mix) | 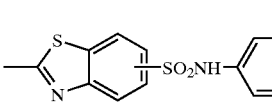 (5, 6-mix) | 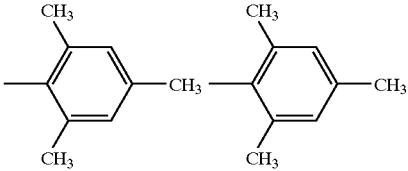 | 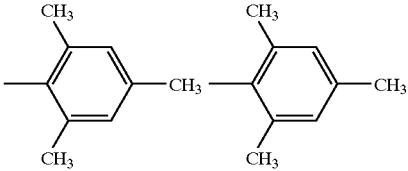 |
| a-35 | 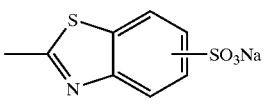 (5, 6-mix) | 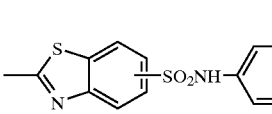 (5, 6-mix) | 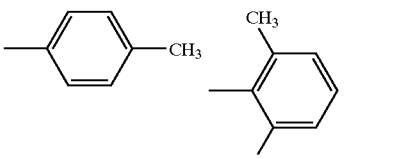 | 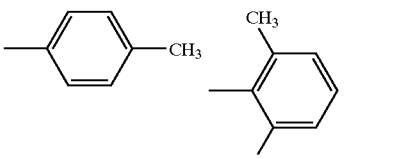 |

TABLE 7

| Dye | R₁ | R₂ | R₃ | R₄ |
|---|---|---|---|---|
| a-36 | 2-methylbenzothiazol-6-yl-SO₃Na | 2-methylbenzothiazol-6-yl-SO₃Na | 2,3,4,5-tetramethyl-6-SO₃Na-phenyl | 2,3,4,5-tetramethyl-6-SO₃Na-phenyl |
| a-37 | 2-methylbenzothiazol-6-yl-SO₂NH-(3,5-di-COOK)phenyl | 2-methylbenzothiazolyl | 2,3,4,5-tetramethyl-6-SO₃K-phenyl | 2,3,4,5-tetramethyl-6-SO₃K-phenyl |
| a-38 | 2-methylbenzothiazol-6-yl-SO₃Li | 2-methylbenzothiazol-6-yl-SO₃Li | 3,4,5-trimethyl-SO₃Li-phenyl | 3,4,5-trimethyl-SO₃Li-phenyl |
| a-39 | 2-methylbenzothiazol-6-yl-SO₃Na | 2-methylthiazol-5-yl-SO₃Na | 3,5-dimethyl-4-CH₂N(CH₂COOH)₂-phenyl | 3,5-dimethyl-4-CH₂N(CH₂COOH)₂-phenyl |
| a-40 | 2-methylbenzothiazolyl | 2-methylbenzothiazol-6-yl-SO₃K | 2,3,5,6-tetramethyl-4-SO₃K-phenyl | 2,3,5,6-tetramethyl-4-SO₃K-phenyl |

TABLE 8

| Dye | R₁ | R₂ | R₃ | R₄ | R₅ | R₆ | R₇ | R₈ |
|---|---|---|---|---|---|---|---|---|
| a-41 | 2-methylphenyl | CN | 2-pyridyl | H | CONH₂ | SO₂CH₃ | 2-OC₈H₁₇-phenyl | 2-methylphenyl |
| a-42 | t-butyl | Br | 2-pyridyl | COOEt | H | 2-methylbenzothiazol-5-yl | C₈H₁₇(t) | COCH₃ |
| a-43 | 2-pyridyl | SO₂CH₃ | 4-methyl-6-(NHCH₃)-1,3,5-triazin-2-yl with NHCH₃ | CONH₂ | H | 6-chloro-2-methylbenzothiazol-5-yl | 4-methylphenyl | CO-t-Bu |

TABLE 8-continued

| Dye | R₁ | R₂ | R₃ | R₄ | R₅ | R₆ | R₇ | R₈ |
|---|---|---|---|---|---|---|---|---|
| a-44 | t-Bu | CN | 2,5-dicyano-4-methylphenyl | H | H | 5-chloro-2-methylbenzothiazol-2-yl | 2-methylphenyl | SO₂CH₃ |
| a-45 | t-Bu | Br | 3,5-dichloro-4-methyl-phenyl (with NO₂) | H | CONH₂ | COCH₃ | 2,4,6-trimethylphenyl | 4-octylphenyl |
| a-46 | t-Bu | CN | benzothiazol-2-yl | CH₃ | H | 2-methylbenzothiazol-2-yl | 2,4-diethyl-6-methylphenyl | 2,4-diethyl-6-methylphenyl |

TABLE 9

[Structure: isothiazole-CN with R1, linked via N=N azo to pyridine bearing R2, R3, NR4R5, and HN-R6 groups]

| Dye | R1 | R2 | R3 | R4 | R5 | R6 |
|---|---|---|---|---|---|---|
| b-1 | $CH_3$ | $CH_3$ | CN | H | —C$_6$H$_4$—$C_8H_{17}$ | —C$_6$H$_4$—$C_8H_{17}$ |
| b-2 | $CH_3$ | $CH_3$ | CN | H | 2,3,5-trimethylphenyl | 2,3,5-trimethylphenyl |
| b-3 | $CH_3$ | $CH_3$ | $CONH_2$ | H | —C$_6$H$_4$—$C_8H_{17}$ | 2,3,5-trimethylphenyl |
| b-4 | $CH_3$ | $CH_3$ | H | H | 2,3,4,5-tetramethyl-6-sulfonatolithium-phenyl | 2,3,4,5-tetramethyl-6-sulfonatolithium-phenyl |
| b-5 | $CH_3$ | H | CN | H | —C$_6$H$_4$—$SO_3Na$ | —C$_6$H$_4$—$SO_3Na$ |

TABLE 10

[Structure: same core as Table 9]

| Dye | R1 | R2 | R3 | R4 | R5 | R6 |
|---|---|---|---|---|---|---|
| b-6 | $CH_3$ | $CH_3$ | H | 2-benzothiazolyl | 2,3,5,6-tetramethyl-4-[$CH_2N(CH_2CO_2K)_2$]-phenyl | 2,3,5,6-tetramethyl-4-[$CH_2N(CH_2CO_2K)_2$]-phenyl |

TABLE 10-continued
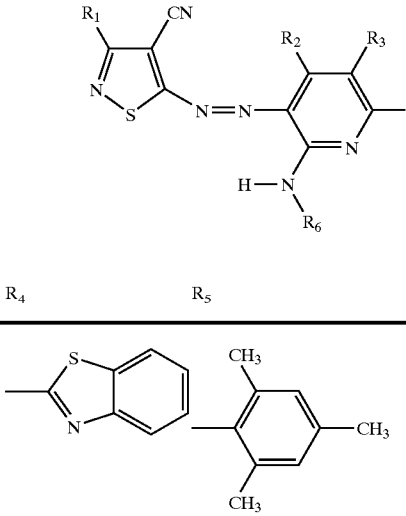
| Dye | R₁ | R₂ | R₃ | R₄ | R₅ | R₆ |
|---|---|---|---|---|---|---|
| b-7 | CH₃ | CH₃ | H | 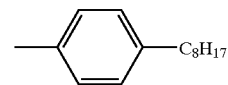 | 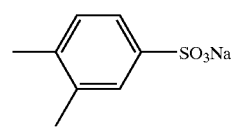 | 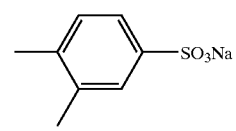 |
| b-8 | CH₃ | H | H | SO₂CH₃ | 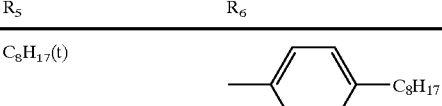 | 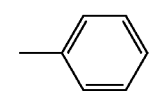 |
TABLE 11
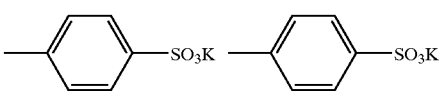
| Dye | R₁ | R₂ | R₃ | R₄ | R₅ | R₆ |
|---|---|---|---|---|---|---|
| c-1 | —SCH₃ | CH₃ | CN | H | C₈H₁₇(t) | 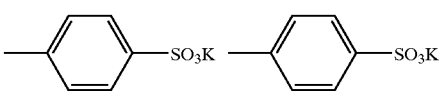 |
| c-2 | 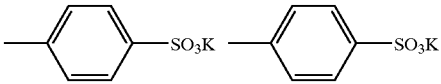 | H | CONH₂ | H | —⟨⟩—SO₃K | —⟨⟩—SO₃K |
| c-3 | —S—CH₂—SO₃KCH₃ | H | | 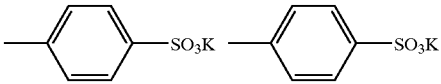 | —⟨⟩—SO₃K | —⟨⟩—SO₃K |
| c-4 | —CH₃ | CH₂ | H | 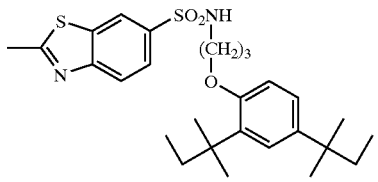 | 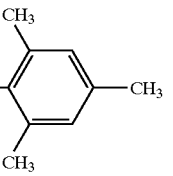 | 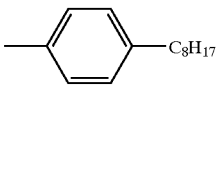 |

TABLE 11-continued

[Structure: R1-substituted thiadiazole-azo-pyridine with R2, R3, R4, R5, R6 substituents; pyridine has NH-R6 and N(R4)(R5) groups]

| Dye | R₁ | R₂ | R₃ | R₄ | R₅ | R₆ |
|---|---|---|---|---|---|---|
| c-5 | phenyl (tolyl) | H | H | 2-methylbenzothiazol-6-yl-NHSO₂-(2-OC₈H₁₇(n), 4-C₈H₁₇(t))phenyl | mesityl (2,4,6-trimethylphenyl) | C₈H₁₇(t) |

TABLE 12

[Structure: R¹-substituted 1,3,4-thiadiazole-azo-pyridine with R², R³, R⁴, R⁵, R⁶ substituents]

| Dye | R₁ | R₂ | R₃ | R₄ | R₅ | R₆ |
|---|---|---|---|---|---|---|
| d-1 | Me | CH₃ | CN | H | 4-SO₃K-phenyl | 4-SO₃K-phenyl |
| d-2 | Me | CH₃ | CN | H | 2,6-diethyl-4-methylphenyl | 2,6-diethyl-4-methylphenyl |
| d-3 | Me | H | H | 2-methylbenzothiazolyl | 2,6-diethyl-4-methyl-3-SO₃K-phenyl | 2,6-diethyl-4-methyl-3-SO₃K-phenyl |
| d-4 | Ph | CH₃ | CONH₂ | H | 4-C₈H₁₇-phenyl | 4-C₈H₁₇-phenyl |

TABLE 12-continued

| Dye | R₁ | R₂ | R₃ | R₄ | R₅ | R₆ |
|---|---|---|---|---|---|---|
| d-5 | Ph | CH₃ | H | 2-methylbenzothiazol-6-yl-SO₂NH(CH₂)₃O-(2,4-di-tert-pentylphenyl) | 4-(n-butoxy)phenyl | 2,4,6-trimethyl-3,5-diethylphenyl |

TABLE 13

| Dye | R₁ | R₂ | R₃ | R₄ | R₅ | R₆ |
|---|---|---|---|---|---|---|
| e-1 | 5-Cl | CH₃ | CONH₂ | H | C₈H₁₇(t) | C₈H₁₇(t) |
| e-2 | 5,6-diCl | H | H | 2-methylbenzothiazol-2-yl | 4-C₈H₁₇-phenyl | 4-C₈H₁₇-phenyl |
| e-3 | 5,6-diCl | CH₃ | H | 2-methylbenzothiazol-2-yl | 2,3,4,6-tetramethylphenyl | COCH₃ |
| e-4 | 5-CH₃ | H | CN | H | 4-SO₃K-phenyl | 4-SO₃K-phenyl |
| e-5 | 5-NO₂ | CH₃ | H | SO₂CH₃ | 2,3-dimethylphenyl | 2,3,5-trimethylphenyl |

TABLE 13-continued

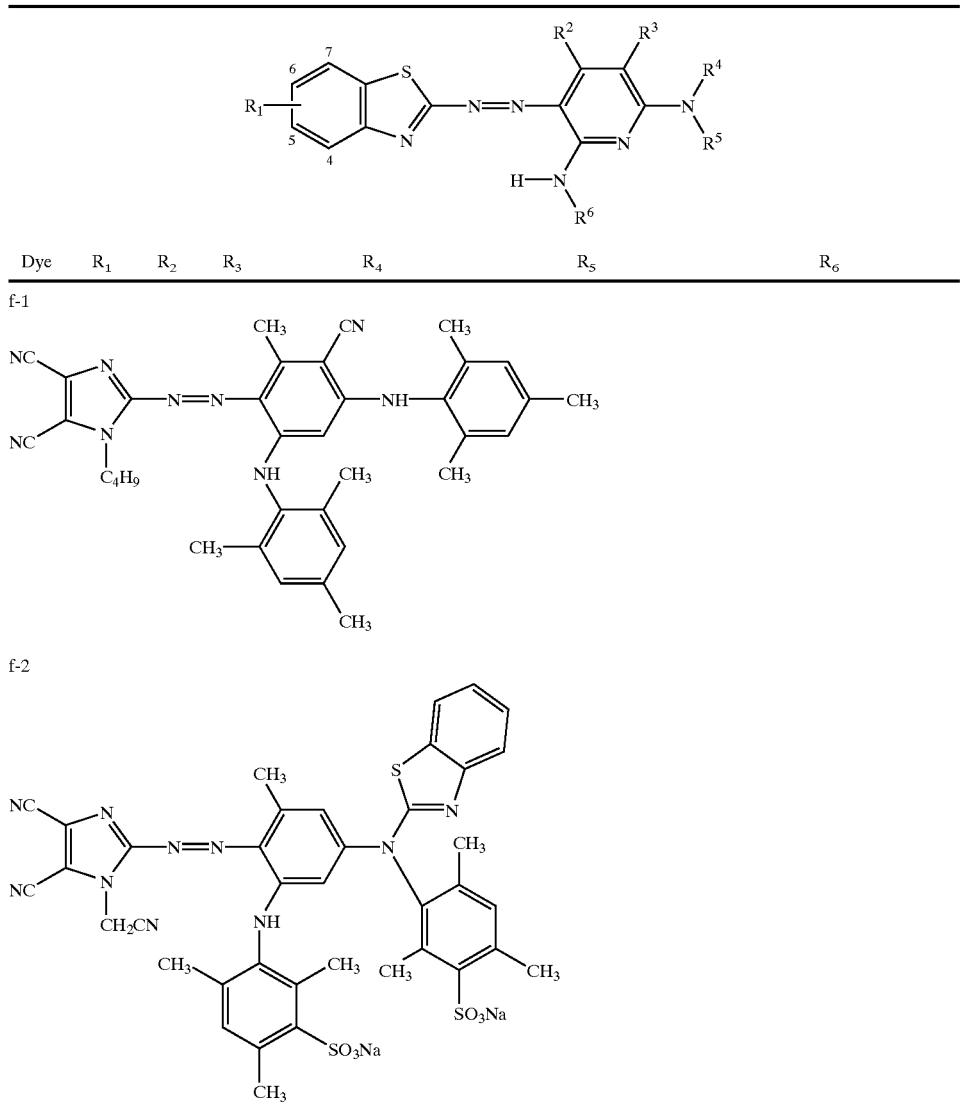

In the inkjet ink set of the present invention, the content of the dye in each ink composition is preferably from 0.2 to 20 wt. %, more preferably from 0.5 to 15 wt. % based on the total weight of the ink composition. When in combination with this ink, an ink of a lower dye density, that is, so-called light ink is used in the ink set, it contains a dye within a range of 1/20 to 1/2, preferably from 1/10 to 3/7, of the above-described weight-base dye concentration. This makes it possible to constitute an ink set composed of a main ink and another ink having an absorbance falling within a range of from 1/20 to 1/2, preferably from 1/10 to 3/7 of the absorbance of the main ink, thereby improving the quality of the gradation drawing of details. When a plurality of dyes are used as a mixture, it is not always necessary to use, for the main ink and the light ink, a combination of the same dyes or a combination of the dyes at a same composition ratio.

For magenta type inks such as magenta and light magenta, two or more of the dyes represented by the formula (1) may be used as a mixture. Use of the dye of the formula (1) with another known magenta dye as a mixture is also preferred.

As the absorbance of an ink, employed is an average of the absorbances, as measured by a spectrophotometer, on both sides 10 nm from the absorption peak of the dye in the ink diluted to 10000 times with pure water.

For the ink constituting the ink set of the present invention, pigments are also usable. Commercially available ones and known ones described in various literatures can be used. Examples of the literature include *Color Index* (edited by The Society of Dyers and Colourists), *Kaitei Shinpan Ganryo Binran* edited by Nippon Ganryo Gijutsu Kyokai (1989), *Saishin Ganryo Oyo Gijutsu* published by CMC Shuppan (1986), *Insatsu Ink Gijutsu* published by CMC Shuppan (1984), and *Industrial Organic Pigments* written by W. Herbst and K. Hunger (VCH Verlagsgesellschaft, 1993). Specific examples of the pigment include organic pigments such as azo pigments (azo lake pigments, insoluble azo pigments, condensed azo pigments and chelate azo pigments), polycyclic pigments (phthalocyanine pigments, anthraquinone pigments, perylene and perinone pigments, indigo pigments, quinacridone pigments, dioxazine pigments, isoindolinone pigments, quinophthalone pigments and diketopyrropyrole pigments), dyeing lake pigments (lake pigments of an acid or basic dye) and azine pigments; and inorganic pigments such as yellow pigments, e.g., C.I. Pigment Yellows 34, 37, 42 and 53, red pigments, e.g., C.I. Pigment Reds 101 and 108, and blue pigments, e.g., C.I. Pigment Blues 27, 29, and 17:1, black pigments such as C.I. Pigment Black 7 and magnetite, and white pigments such as C.I. Pigment Whites 4, 6, 18 and 21.

As pigments having favorable color tone for image formation, preferred blue or cyan pigments include phthalocyanine pigments, anthraquinone series indanthrone pigments (for example, C.I. Pigment Blue 60) and triarylcarbonium pigments of the dyeing lake pigment, of which phthalocyanine pigments (preferably, copper phthalocyanine pigments such as C.I. Pigment Blues 15:1, 15:2, 15:3, 15:4 and 15:6, monochloro or low-chlorinated copper phthalocyanine pigments, aluminum phthalocyanine pigments as described in European Patent 860475, nonmetallophthalocyanine pigments such as C.I. Pigment Blue 16, and phthalocyanine pigments having as a central metal Zn, Ni or Ti, particularly preferably, C.I. Pigment Blues 15:3 and 15:4, and aluminum phthalocyanine pigments) are most preferred.

As red or purple pigments, preferably employed are azo pigments (preferred examples include C.I. Pigment Reds 3, 5, 11, 22, 38, 48:1, 48:2, 48:3, 48:4, 49:1, 52:1, 53:1, 57:1, 63:2, 144, 146 and 184, and particularly preferred are C.I. Pigment Reds 57:1, 146 and 184), quinacridone pigments (preferred examples include C.I. Pigment Reds 122, 192, 202, 207 and 209 and C.I. Pigment Violets 19 and 42, and particularly preferred is C.I. Pigment Red 122), triarylcarbonium pigments of the dyeing lake pigment family (preferred examples include C.I. Pigment Red 81:1 and C.I. Pigment Violets 1, 2, 3, 27 and 39 of the xanthene family), dioxazine pigments (for example, C.I. Pigment Violets 23 and 37), diketopyrrolopyrrole pigments (for example, C.I. Pigment Red 254), perylene pigments (for example, C.I. Pigment Violet 29), anthraquinone pigments (for example, C.I. Pigment Violets 5:1, 31 and 33) and thioindigo pigments (for example, C.I. Pigment Reds 38 and 88).

As yellow pigments, azo pigments (preferred examples include monoazo pigments such as C.I. Pigment Yellows 1, 3, 74 and 98, disazo pigments such as C.I. Pigment Yellows 12, 13, 14, 16, 17 and 83, and general azo pigments such as C.I. Pigment Yellows 93, 94, 95, 128 and 155, and benzimidazolone pigments such as C.I. Pigment Yellows 120, 151, 154, 156 and 180, of which pigments using no benzidine compound as a raw material are particularly preferred), isoindoline.isoindolinone pigments (preferred examples include C.I. Pigment Yellows 109, 110, 137 and 139), quinophthalone pigments (preferred examples include C.I. Pigment Yellow 138) and flavanthrone pigments (for example, C.I. Pigment Yellow 24) are preferably used.

Preferred black pigments include inorganic pigments (preferably, carbon black and magnetite) and aniline black.

Orange pigments (for example, C.I. Pigment Oranges 13 and 16) and green pigments (for example, C.I. Pigment Green 7) may also be usable.

These pigments are usable for the ink set either as bare pigments or surface-treated pigments. The surface treating methods which are considered to be applicable to these pigments include a method of coating surfaces of the pigments with a resin or wax, a method of adhering a surfactant to surfaces of the pigments, and a method of bonding a reactive substance (for example, a silane coupling agent, an epoxy compound, polyisocyanate or a radical generated from a diazonium salt) to surfaces of the pigments. They are described in the following literatures and patents:

(1) *Kinzoku Sekken no Seishitsu to Oyo* (Saiwai Shobo);
(2) *Insatsu Ink Insatsu* (CMC Shuppan, 1984);
(3) Saishin Ganryo Oyo Gijutsu (CMC Shuppan, 1986);
(4) U.S. Pat. Nos. 5,554,739 and 5,571,311; and
(5) JP-A-9-151342, JP-A-10-140065, JP-A-10-292143 and JP-A-11-166145.

In particular, self dispersible pigments prepared by allowing diazonium salts, which have been described in the U.S. patents of the above (4), to act on carbon black, and capsulated pigments prepared by methods described in the Japanese patents of the above (5) are particularly effective, because dispersion stability can be attained without adding an excess dispersant to ink.

In the invention, pigments which have been dispersed by a dispersant may be used. As the dispersants, various known ones, for example, surfactant type low-molecular dispersants and polymer type dispersants are usable, depending on the pigments used. Examples of the dispersants include those described in JP-A-3-69949 and European Patent 549, 486. Upon using the dispersants, pigment derivatives called synergists may be added for enhancing adsorption of the dispersants to the pigments.

The particle size of the pigment preferably falls within a range of 0.01 to 10 $\mu$m after dispersion, more preferably 0.05 to 1 $\mu$m.

The pigments are dispersed by known dispersing techniques used in the production of ink or toner. Dispersing devices include a vertical or horizontal agitator mill, an attritor, a colloid mill, a ball mill, a triple roll mill, a pearl mill, a super mill, an impeller, a disperser, a KD mil, a dynatron and a pressure kneader. Details thereof are described in *Saishin Ganryo Oyo Gijutsu* (CMC Shuppan, 1986).

The colorant (the term "colorant" as used herein means both a dye and a pigment) used in the present invention is substantially water soluble or water dispersible. The colorant has a water solubility or dispersibility at 20° C. of 2 wt. % or greater, preferably 5 wt. % or greater.

The inks to be used for the ink set of the present invention are characterized in that they have a conductivity falling within a range of from 0.01 to 10 S/m, preferably from 0.05 to 5S/m.

The conductivity can be measured by the electrode method using commercially available saturated potassium chloride.

The conductivity is controllable mainly by an ion concentration in the aqueous solution. When the salt concentration is too high, an ultrafiltration membrane can be used for desalting. When the conductivity is adjusted by the addition of a salt, on the other hand, various salts such as organic salts and inorganic salts can be added for adjustment.

Examples of the inorganic salts include potassium halide, sodium halide, sodium sulfate, potassium sulfate, sodium bisulfate, potassium bisulfate, sodium nitrate, potassium nitrate, sodium bicarbonate, potassium bicarbonate, sodium phosphate, sodium monohydrogen phosphate, boric acid, potassium dihydrogen phosphate, and sodium dihydrogen phosphate; and those of the organic salts include sodium acetate, potassium acetate, potassium tartrate, sodium tartrate, sodium benzoate, potassium benzoate, sodium p-toluenesulfonate, potassium saccharinate, gallium phthalate and sodium picolinate.

Alternatively, by selecting components for an aqueous medium which will be described later, the conductivity can be adjusted.

A description will next be made of a surfactant to be incorporated in the inks used for the ink set of the present invention.

In the present invention, a surfactant is incorporated in the ink to control the physical properties of the ink solution. This brings about excellent effects, for example, improves the discharge stability of the ink, improves the water resistance of a resulting image and prevents bleeding of the printed ink.

Examples of the surfactant include anionic surfactants such as sodium dodecyl sulfate, sodium dodecyloxy sulfonate and sodium alkylbenzene sulfonate; cationic surfactants such as cetyl pyridinium chloride, trimethyl cetyl ammonium chloride and tetrabutylammonium chloride; and nonionic surfactants such as polyoxyethylene nonyl phenyl ether, polyoxyethylene naphthyl ether and polyoxyethylene octyl phenyl ether. Of these, nonionic surfactants are preferably employed.

The surfactant is added in an amount of from 0.001 to 15 wt. %, preferably from 0.005 to 10 wt. %, more preferably from 0.01 to 5 wt. % based on the ink.

When an oil soluble dye is contained in the ink constituting the ink set, the oil soluble dye is dissolved in a high boiling point organic solvent and then, the resulting solution is emulsified and dispersed in an aqueous medium.

The high boiling point organic solvent usable in the present invention has a boiling point of 150° C. or greater, preferably 170° C. or greater.

Examples include phthalate esters (such as dibutyl phthalate, dioctyl phthalate, dicyclohexyl phthalate, di-2-ethylhexyl phthalate, decyl phthalate, bis(2,4-di-tert-amylphenyl) isophthalate, and bis(1,1-diethylpropyl) phthalate), phosphate or phosphonate esters (such as diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate, and di-2-ethylhexylphenyl phosphate), benzoate esters (such as 2-ethylhexyl benzoate, 2,4-dichlorobenzoate, dodecyl benzoate, and 2-ethylhexyl-p-hydroxy benzoate), amides (such as N,N-diethyldodecanamide and N,N-diethyllaurylamide), alcohols or phenols (such as isostearyl alcohol and 2,4-di-tert-amylphenol), aliphatic esters (such as dibutoxyethyl succinate, di-2-ethylhexyl succinate, 2-hexyldecyl tetradecanoate, tributyl citrate, diethyl azelate, isostearyl lactate and trioctyl citrate), aniline derivatives (such as N,N-dibutyl-2-butoxy-5-tert-octylaniline), chlorinated paraffins (such as paraffins having a chlorine content of 10 to 80%), trimesate esters (such as tributyl trimesate), dodecyl benzene, diisopropyl naphthalene, phenols (such as 2,4-di-tert-amylphenol, 4-dodecyloxyphenol, 4-dodecyloxycarbonylphenol and 4-(4-dodecyloxyphenylsulfonyl)phenol), carboxylic acids (such as 2-(2,4-di-tert-amylphenoxybutyric acid and 2-ethoxyoctanedacanoic acid), and alkylphosphoric acids (such as di-2(ethylhexyl)phosphoric acid and diphenylphosphoric acid). These high boiling point organic solvents may be used in an amount of 0.01 to 3 times the weight, preferably 0.01 to 1.0 time the weight of the oil soluble dye. When the dye or the other involatile matters are dispersed in the ink, existence of the high boiling point organic solvent prevents easy precipitation of them, and improves the stability of the ink, which leads to an improvement in the discharge stability.

These high-boiling-point organic solvents may be used either singly or in combination of plural kinds [for example, a combination of tricresyl phosphate and dibutyl phthalate, trioctyl phosphate and di(2-ethylhexyl)sebacate, or dibutyl phthalate and poly(N-t-butyl acrylamide)].

Examples of the other compounds usable in the present invention as a high boiling point organic solvent and/or synthesizing processes thereof are described, for example, in U.S. Pat. No. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,430,422, 4,464,464, 4,483,918, 4,540,657, 4,684,606, 4,728,599, 4,745,049, 4,935,321, or 5,013,639; European Patent No. 2,76,319A, 286,253A, 289,820A, 309, 158A, 309,159A, 309,160A, 509,311A, or 510,576A; East German Patent No. 147,009, 157,147, 159,573, or 225, 240A; British Patent No. 2,091,124A; JP-A-48-47335, 50-26530, 51-25133, 51-26036, 51-27921, 51-27922, 51-149028, 52-46816, 53-1520, 53-1521, 53-15127, 53-146622, 54-91325, 54-106228, 54-118246, 55-59464, 56-64333, 56-81836, 59-204041, 61-84641, 62-118345, 62-247364, 63-167357, 63-214744, 63-301941, 64-9452, 64-9454, 64-68745, 1-101543, 1- 102454, 2-792, 2-4239, 2-43541, 4-49237, 4-30165, 4-232946 or 4-346338.

The above-described high boiling point organic solvents may be used in an amount of 0.01 to 3.0 times the weight, preferably from 0.01 to 1.0 time the weight of the oil soluble dye.

In the invention, the oil soluble dye or high boiling point organic solvent is dispersed and emulsified in an aqueous medium. Upon emulsification and dispersion, a low boiling point organic solvent is usable from the viewpoint of emulsifying properties. The low boiling point organic solvent is an organic solvent having a boiling point of about 30° C. or greater but not greater than 150° C. under normal pressure. Preferred examples include, but not limited to, esters (for example, ethyl acetate, butyl acetate, ethyl propionate, β-ethoxyethyl acetate and methyl cellosolve acetate), alcohols (such as isopropyl alcohol, n-butyl alcohol and secondary butyl alcohol), ketones (such as methyl isobutyl ketone, methyl ethyl ketone and cyclohexanone), amides (such as dimethylformamide and N-methylpyrrolidone) and ethers (such as tetrahydrofuran and dioxane).

Emulsification and dispersion are conducted for the purpose of forming fine oil droplets of an oil phase by dispersing, in an aqueous phase composed mainly of water, an oil phase having a dye dissolved in a high boiling point organic solvent, in some cases, in a mixed solvent thereof with a low boiling point organic solvent. At this time, an additive such as surfactant, humectant, dye stabilizer, emulsion stabilizer, antiseptic and/or antifungal agent, which will be described later, can be added as needed to either one of the aqueous phase or oil phase or both of them.

For emulsification, addition of an oil phase to an aqueous phase is generally employed. Alternatively, so-called phase inversion emulsification wherein an aqueous phase is added dropwise to an oil phase can be preferably employed. The above-described emulsification method is applicable to the case where the azo dye used in the present invention is water soluble and the additive is oil soluble.

Upon emulsification and dispersion, various surfactants can be employed. Preferred examples include anionic surfactants such as fatty acid salts, alkyl sulfates, alkylbenzene sulfonates, alkylnaphthalene sulfonates, dialkyl sulfosuccinates, alkyl phosphates, naphthalenesulfonic acid-formalin condensate, and polyoxyethylene alkyl sulfates; and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkyl amines, glycerin fatty acid esters, and oxyethylene oxypropylene block copolymers. SURFYNOLS (trade name; product of Air Products & Chemicals) which are acetylene series polyoxyethylene oxide surfactants are also preferably employed. Amine oxide type amphoteric surfactants such as N,N-dimethyl-N-alkylamine oxides are also preferred. Moreover, surfactants as described in JP-A-59-157636 (pp. 37–38), and Research Disclosure No. 308119 (1989) are also usable.

In order to stabilize the emulsion just after emulsification, a water soluble polymer can be added in combination with the surfactant. As the water soluble polymer, polyvinyl alcohol, polyvinyl pyrrolidone, polyethylene oxide, polyacrylic acid and polyacrylamide, and copolymers thereof are preferred. Natural water-soluble polymers such as polysaccharides, casein and gelatin are also preferred. In order to stabilize the dispersion of a dye, it is possible to use, in combination, a polymer such as polyvinyl, polyurethane, polyester, polyamide, polyurea or polycarbonate which is substantially insoluble in an aqueous medium and is available by the polymerization of an acrylate ester, methacrylate ester, vinyl ester, acrylamide, methacrylamide, olefin, styrene, vinyl ether, or acrylonitrile. These polymers preferably contain —$SO_3^-$ or —$COO^-$. When such a polymer substantially insoluble in an aqueous medium is used in combination, it is added preferably in an amount of 20 wt. % or less, more preferably 10 wt. % or less, based on the high boiling point organic solvent.

Upon preparation of an aqueous ink by dispersing and emulsifying the oil soluble dye or high boiling point organic solvent, control of its particle size is of particular importance. It is essential to minimize the average particle size in order to heighten color purity or density upon formation of an image by inkjet. The volume-average particle size is preferably 1 μm or less, more preferably from 5 to 100 nm.

The volume average particle size and particle size distribution of the dispersed particles can be measured readily in a known manner, for example, the static light scattering method, dynamic light scattering method, centrifugal precipitation method or the method described on pages 417 to 418 of *Jikken Kagaku Koza*, 4th Edition. For example, a particle size can be measured easily by diluting an ink with distilled water to give the particle concentration in the ink of 0.1 to 1 wt. % and measuring the resulting diluted ink by a commercially available volume-average particle size measuring instrument (for example, Microtrac UPA (trade name; product of Nikkiso Co., Ltd.). The dynamic light scattering method using Laser Doppler effect is especially preferred because it permits measurement of even small particle size.

The volume-average particle size is an average particle size based on the volume of the particles and it is found by multiplying the diameter of each particle by its volume and then dividing the sum of the products by the total volume of the particles. A description on the volume average particle size can be found on page 119 of *Kobunshi Latex no Kagaku* (written by Soichi Muroi, published by Kobunshi Kankokai).

It has been revealed that the existence of coarse particles plays an important role in printing performance. Described specifically, coarse particles cause clogging of a head nozzle or, if not so, form a stain and prevent discharge or cause irregular discharge of the ink, thereby having a serious influence on the printing performance. To prevent such phenomena, it is important to control the number of the particles having a particle size of 5 μm or greater to 10 or less and the number of the particles having a particle size of 1 μm or greater to 100 or less, each in 1 μl of the resulting ink.

Such coarse particles can be removed by known centrifugal separation or precise filtration. Such separation may be conducted rightly after dispersion and emulsification, or after addition of various additives such as humectant and surfactant to the emulsified dispersion but rightly before filling an ink cartridge with the mixture.

A mechanical emulsifier can be employed as effective means for decreasing the average particle size and removing coarse particles.

As the emulsifier, usable are known ones such as simple-system stirrer, mill-system emulsifiers such as impeller agitator, inline agitator and colloid mill and ultrasonic system emulsifier, with use of a high pressure homogenizer being especially preferred.

The mechanism of a high pressure homogenizer is described in detail in U.S. Pat. No. 4,522,354 or JP-A-6-47264. Examples of the commercially available one include Gaulin homogenizer (product of A.P.V GAULIN INC), microfluidizer (product of MICROFLUIDEX INC.) and Ultimaizer (product of Sugino Machine).

A high pressure homogenizer as described in U.S. Pat. No. 5,720,551 having a mechanism for forming fine particles in a ultrahigh pressure jet stream is particularly effective for dispersion and emulsification of the invention. "DeBEE 2000" (product of BEE INTERNATIONAL LTD.) is one of the emulsifiers adopting this ultrahigh pressure jet stream.

The pressure upon emulsification by a high pressure emulsifier is at least 50 MPa, preferably at least 60 MPa, still more preferably at least 180 MPa.

Use of at least two emulsifiers, for example, successive use of a stirring emulsifier and a high pressure homogenizer is particularly preferred. It is also preferred to disperse and emulsify by such an emulsifier, add to the resulting emulsion an additive such as humectant or surfactant and subject the resulting mixture to a high pressure homogenizer again while filling a cartridge with the resulting ink.

When both of the high boiling point organic solvent and the low boiling point organic solvent are incorporated, removal of the low boiling point solvent is preferred from the viewpoints of stability, safety and sanitation of the emulsion. The low boiling point solvent can be removed in a known manner, for example, evaporation, vacuum evaporation or ultrafiltration, depending on the kind of the solvent. This removal of the low boiling point organic solvent is preferably conducted as soon as possible rightly after emulsification.

Preparation processes of an inkjet ink are described specifically in JP-A-5-148436, JP-A-5-295312, JP-A-97541, JP-A-7-82515 and JP-A-7-118584. These processes can be applied for the preparation of the ink to be used for the inkjet ink set of the present invention.

To the inkjet recording ink to be used for the ink set of the present invention, a sufficient amount of additives selected as needed from an antidrying agent for preventing clogging due to drying of the ink at a jet orifice, penetration promoter to promote penetration of the ink into paper, ultraviolet absorber, antioxidant, viscosity regulator, surface tension regulator, dispersant, dispersion stabilizer, antifungal agent, rust preventive, pH regulator, antifoaming agent and chelating agent can be added.

As the antidrying agent, water soluble organic solvents having a vapor pressure lower than that of water are preferred. Specific examples include polyhydric alcohols typified by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of a polyhydric alcohol such as ethylene glycol monomethyl (or ethyl) ether, diethylene glycol monomethyl (or ethyl) ether and triethylene glycol monoethyl (or butyl) ether; heterocyclics such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Of these, polyhydric alcohols such as glycerin and diethylene glycol are more preferred. The above-exemplified antidrying agents may be used either singly or in combination. The antidrying agent is preferably added in an amount of 10 to 50 wt. % of the ink.

Examples of the penetration promoter usable in the invention include alcohols such as ethanol, isopropanol, butanol, di- or tri-ethylene glycol monobutyl ether, and 1,2-hexanediol and nonionic surfactants such as sodium lauryl sulfate and sodium oleate. Incorporation of it in an amount of 10 to 30 wt. % in an ink brings about sufficient effects. It is preferably added in an amount within a range causing neither bleeding of print nor print-through.

Examples of the ultraviolet absorber to be used in the invention for improving the shelf life of images recorded using the ink set ink of the present invention include benzotriazole compounds as described in JP-A-58-185677, 61-190537, 2-782, 5-197075 and 9-34057, benzophenone compounds as described in JP-A-46-2784 and 5-194483 and U.S. Pat. No. 3,214,463, cinnamic acid compounds as described in JP-B-48-30492 and 56-21141 and JP-A-10-88106/1998, triazine compounds as described in JP-A-4-298503, 8-53427, 8-239368 and 10-182621 and JP-T-8-501291 (the term "JP-T" as used herein means a published Japanese translation of a PCT patent application), and compounds so called fluorescent brightener such as those as described in Research Disclosure No. 24239, stilbene and benzoxazole compounds which emit fluorescence, absorbing ultraviolet rays.

As the antioxidant to be used for improving the shelf life of images, various organic and metal complex type discoloration preventives can be used. The organic discoloration preventives include hydroquinones, alkoxyphenols, dialkoxyphenols, phenols, anilines, amines, indanes, chromans, alkoxyanilines and heterocyclics, while the metal complex discoloration preventives include nickel complexes and zinc complexes. More specifically, the compounds described in patents cited in Research Disclosure (RD) No. 17643, VII, items I to J, RD No. 15162, RD No. 18716, page 650, left column, RD No. 36544, page 527, RD No. 307105, page 872, and RD No. 15162, as well as the compounds included in the general formulas of typical compounds and in compound examples described in JP-A-62-215272, pages 127 to 137.

Examples of the antifungal agent to be used in the invention include sodium dehydroacetate, sodium benzoate, sodium pyridinethion-1-oxide, ethyl p-hydroxybenzoate and 1,2-benzisothiazolin-3-one and salts thereof. It is preferably added in an amount of 0.02 to 5.00 wt. % of the ink.

Details of the antifungal agent are described in *Boukin Boukabizai Jiten* (ed. by The Society for Antibacterial and Antifungal Agents, Japan).

Examples of the rust inhibitor include acidic sulfite, sodium thiosulfate, ammonium thioglycolate, diisopropylammonium nitrite, pentaerythritol tetranitrate, dicyclohexylammonium nitrite and benzotriazole. It is preferably added in an amount of 0.02 to 5.00 wt. % in the ink.

As the pH regulator to be added to the inkset ink of the invention, preferred are those suited in regulating pH of the ink and imparting the ink with dispersion stability. It is preferably added to adjust the pH of the ink, at 25° C., to 4 to 11. When the pH is less than 4, solubility of the dye lowers, tending to clog the nozzle. When the pH exceeds 11, on the other hand, water resistance tends to be deteriorated. As basic pH regulators, organic bases and inorganic alkalis are usable while as acidic ones, organic acids and inorganic acids are usable.

Examples of the organic bases include triethanolamine, diethanolamine, N-methyldiethanolamine and dimethylethanolamine. Examples of the inorganic alkalis include hydroxides of an alkali metal (ex. sodium hydroxide, lithium hydroxide and potassium hydroxide), carbonates (ex. sodium carbonate and sodium bicarbonate) and ammonia. Examples of the organic acids include acetic acid, propionic acid, trifluoroacetic acid and alkylsulfonic acid. The inorganic acids include hydrochloric acid, sulfuric acid and phosphoric acid.

In addition to the above-described surfactants, nonionic, cationic and anionic surfactants are usable in the invention as surface tension regulator. Examples of the anionic surfactants include fatty acid salts, alkyl sulfates, alkylbenzene sulfonates, alkylnaphthalene sulfonates, dialkyl sulfosuccinates, alkyl phosphates, naphthalenesulfonic acid formalin condensate, and polyoxyethylene alkyl sulfates; those of the nonionic surfactants include polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkylamines, glycerin fatty acid esters, and oxyethylene oxypropylene block copolymers. SURFYNOLS (trade name; product of Air Products & Chemicals Inc.) which are acetylene type polyoxyethylene oxide surfactants are also preferably employed. Amine oxide type amphoteric surfactants such as N,N-dimethyl-N-alkylamine oxide are also preferred. Surfactants as described in JP-A-59-157636 (pp. 37–38) and Research Disclosure No. 308119 (1989) are also usable.

The ink set ink of the invention has preferably a surface tension of 20 to 60 mN/m, more preferably 25 to 45 mN/m, irrespective of the use of the surface tension regulator.

The ink set ink has preferably a viscosity of 30 mPa·s or less. Since it is preferably adjusted to 20 mPa·s or less, a viscosity regulator is sometimes added to adjust its viscosity. Examples of the viscosity regulator include celluloses, water soluble polymers such as polyvinyl alcohol, and nonionic surfactants. More specific description about viscosity regulators can be found in Chapter 9 of *Nendo Chosetsu Gijitsu* (Information Technology Association, 1999) and pages 162 to 174 of Chemicals for Inkjet Printers (Supplement, 98)—*Zairyo no Kaihatsu Doko•Tenbo Chousa—(CMC, 1997)*).

In the invention, it is also possible to add, as needed, the above-described cationic, anionic or nonionic surfactant as a dispersant or dispersion stabilizer, a fluorine or silicon compound as an antifoaming agent and a chelating agent typified by EDTA.

When an ink solution for the ink set of the present invention is prepared, it is preferred to dissolve an ink, if it is a water soluble ink, in water first. Then, various solvents and additives are added to the resulting solution to dissolve the former in the latter, followed by mixing to form a uniform ink solution.

For dissolving, usable are various methods by agitation, exposure to ultrasonic waves and shaking. Of these, agitation is particularly preferred. Agitation can be carried out by various methods known in this field such as fluid agitation, and agitation making use of a shear force of a reversing agitation or dissolver. Alternatively, agitation, for example, as a magnetic stirrer, making use of a shear force with the bottom surface of a container can be preferably employed.

Recording paper and recording film to be used in the inkjet recording method to which the invention is applied will next be described. As recording paper and recording film, usable are those having, as a support, chemical pulp such as LBKP or NBKP, mechanical pulp such as GP, PGW, RMP, TMP, CTMP, CMP or CGP, or recycled pulp such as DIP, to which conventionally known additives such as pigment, binder, sizing agent, fixer, cationic agent and paper strength agent have been added as needed, and made using paper machine such as wire paper machine or cylinder paper machine. Alternatively, the support may be either synthetic paper or plastic film sheet and it preferably has a thickness of 10 to 250 $\mu$m and a basis weight of 10 to 250 g/m$^2$.

The support may be used as a receiving material after disposing thereon an image receiving layer and back coat layer, or after disposing a size press or anchor coat layer by using starch or polyvinyl alcohol and then disposing thereon an image receiving layer and a back coat layer. The support may further be subjected to flattening treatment by a calendering machine such as machine calender, TG calender or soft calender.

In the invention, paper or a plastic film having both sides thereof laminated with polyolefin (ex. polyethylene, polystyrene, or polybutene, or copolymer thereof) or polyethylene terephthalate is preferably employed as the support. Addition of a white pigment (ex. titanium oxide or zinc oxide) or a tinting dye (ex. cobalt blue, ultramarine or neodium oxide) to polyolefin is preferred.

In the image receiving layer disposed on the support, a porous material and an aqueous binder are incorporated. The image receiving layer preferably contains a pigment, preferably a white pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate and organic pigments such as styrene pigments, acrylic pigments, urea resins and melamine resins. As the white pigment, porous white inorganic pigment, particularly, synthetic amorphous silica having a large pore area is suited. As the synthetic amorphous silica, silicic anhydride available by dry process and hydrated silicic acid available by wet process are usable, of which hydrated silicic acid is desired. These pigments may be used in combination.

Specific examples of the recording paper which contains the pigment in its image receiving layer include those disclosed in JP-A-10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777 and 2001-301314.

Examples of the aqueous binder contained in the image receiving layer include water soluble polymers such as polyvinyl alcohol, silanol-modified polyvinyl alcohol, starch, cationated starch, casein, gelatin, carboxymethyl cellulose, hydroxyethyl cellulose, polyvinylpyrrolidone, polyalkylene oxide and polyalkylene oxide derivatives and water dispersible polymers such as styrene butadiene latex and acrylic emulsion. These aqueous binders may be used either singly or in combination. Of them, polyvinyl alcohol and silanol-modified polyvinyl alcohol are particularly preferred from the viewpoints of adhesion to the pigment and peel resistance of the ink receptive layer.

The image receiving layer may contain, in addition to the pigment and aqueous binder, additives such as mordant, water proofing agent, light resistance improver, gas resistance improver surfactant and hardener.

The mordant to be added to the image receiving layer is preferably immobilized. A polymeric mordant is preferably employed for this purpose.

Polymeric mordants are described in JP-A-48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134 and 1-161236, and U.S. Pat. Nos. 2,484,430, 2,548,564, 3,148,061, 3,309,690, 4,115,124, 4,124,386, 4,193,800, 4,273,853, 4,282,305 and 4,450,224. Image receiving materials containing the polymer mordant as described on pages 212 to 215 of JP-A-1-161236 are particularly preferred. Use of these polymer mordants makes it possible to form an image having excellent image quality and improved light resistance.

A water proofing agent is effective for imparting an image with water resistance and as this agent, cationic resins are particularly desired. These cationic resins include polyamide polyamine epichlorohydrin, polyethyleneimine, polyaminesulfone, dimethyl diallyl ammonium chloride polymer, and cation polyacrylamide. The cationic resin is preferably added in an amount of 1 to 15 wt. %, particularly 3 to 10 wt. % based on the whole solid content of the ink receiving layer.

Examples of the light resistance improver or gas resistance improver include phenol compounds, hindered phenol compounds, thioether compounds, thiourea compounds, thiocyanic acid compounds, amine compounds, hindered amine compounds, TEMPO compounds, hydrazine compounds, hydrazide compounds, amidine compounds, vinyl-containing compounds, ester compounds, amide compounds, ether compounds, alcohol compounds, sulfinic acid compounds, saccharides, water soluble reductive compounds, organic acids, inorganic acids, hydroxy-containing organic acids, benzotriazole compounds, benzophenone compounds, triazine compounds, heterocyclic compounds, water soluble metal salts, organometal compounds and organic complexes.

Specific examples of these compounds are those described in JP-A-10-182621, JP-A-2001-260519, JP-A-2000-260519, JP-B-4-34953, JP-B-4-34513, JP-B-4-34512, JP-A-11-170686, JP-A-60-67190, JP-A-7-276808, JP-22000-94829, JP-T-8-512258, JP-A-11-321090, and the like.

The surfactant functions as a coating aid, peeling improver, slip improver or antistatic agent. Description on it can be found in JP-A-62-173463 and JP-A-62-183457.

Instead of the surfactant, organofluoro compounds may be employed. They are preferably hydrophobic. Examples include fluorine surfactants, oily fluorine compounds (ex. fluorine oil) and solid fluorine compound resins (ex. ethylene tetrafluoride resins). Organofluoro compounds are described in JP-B-57-9053 (8th to 17th columns), and JP-A-61-20994 and JP-A-62-135826.

As the hardener, materials as described on page 222 of JP-A-1-161236, JP-A-9-263036, JP-A-10-119423 and JP-2001-210547 are usable.

As the other additives to the image receiving layer, pigment dispersants, thickeners, antifoaming agents, dyes, fluorescent brighteners, antiseptics, pH regulators, matting agents and hardeners can be used. The ink receiving layer may be either a single layer or a double layer.

The recording paper or recording film may have a back coat layer disposed thereon. To this layer, white pigments, aqueous binders and the other components can be added.

Examples of the white pigment to be incorporated in the back coat layer include white inorganic pigments such as light calcium carbonate, heavy calcium carbonate, kaolin, talc, calcium sulfate, barium sulfate, titanium dioxide, zinc oxide, zinc sulfide, zinc carbonate, white satin, aluminum silicate, diatomaceous earth, calcium silicate, magnesium silicate, synthetic amorphous silica, colloidal silica, colloidal alumina, pseudo boehmite, aluminum hydroxide, alumina, litopone, zeolite, hydrated halloysite, magnesium carbonate and magnesium hydroxide, and organic pigments such as styrene plastic pigments, acrylic plastic pigments, polyethylene, microcapsules, urea resins and melamine resins.

As the aqueous binder to be incorporated in the back coat layer, usable are water soluble polymers such as styrene/maleate salt copolymers, styrene/acrylate salt copolymers, polyvinyl alcohol, silanol-modified polyvinyl alcohol, starch, cationated starch, casein, gelatin, carboxymethyl cellulose, hydroxyethyl cellulose and polyvinylpyrrolidone, and water dispersible polymers such as styrene butadiene latex and acrylic emulsion. Examples of the other component to be incorporated in the back coat layer include antifoaming agent, foaming inhibitor, dye, fluorescent brightener, antiseptic and water proofing agent.

To layers (including back layer) constituting the inkjet recording paper or recording film, a fine particle dispersion of a polymer may be added. It is used in order to improve the physical properties of a film, for example, stabilizing size and preventing curling, adhesion and cracks. A description on the fine particle dispersion of a polymer can be found in JP-A-62-245258, JP-A-62-1316648 and JP-A-62-110066. Addition of a fine particle dispersion of a polymer having a low glass transition point (40° C. or lower) to a mordant-containing layer enables to prevent occurrence of cracks or curling of the layer. Addition of a fine particle dispersion of a polymer having a high glass transition point also prevents occurrence of curling when added to the back layer.

There is no limitation imposed on the inkjet recording method to which the ink set of the present invention is applied. It is used for a known recording method, for example, a charge control method of ejecting ink by making use of electrostatic induction power, a drop-on-demand method (pressure pulse system) making use of oscillation pressure of a piezoelectric element, an acoustic inkjet method of exposing ink to acoustic beams converted from electric signals and utilizing a radiation pressure for discharging ink, and a thermal inkjet (bubble jet) method of heating ink to form bubbles and making use of the pressure thus generated.

Inkjet recording methods include a method of jetting a large number and small volume of low-density inks called photoinks, a method of improving image quality by using a plurality of inks having substantially the same hue but different concentrations and a method of using a colorless transparent ink.

EXAMPLES

The present invention will hereinafter be described in detail by Examples. It should however be borne in mind that the present invention is not limited to or by them.

Example

To the below-described components, deionized water was added to give the whole amount of 1 liter. While heating at 30 to 40° C., the mixture was stirred for one hour. The reaction mixture was then adjusted to pH 9 with 1 mol/l of potassium hydroxide, followed by filtration, under reduced pressure, through a microfilter having an average pore size of 0.25 μm, whereby a light magenta ink solution was prepared.

[Formulation of Light Magenta Ink LM-101]

(Solid Content)

| | |
|---|---|
| Magenta colorant (a-36) | 7.5 g/l |
| Benzotriazole (BTZ) | 0.08 g/l |
| PROXEL XL2 | 3.5 g/l |
| (liquid content) | |
| Glycerin (GR) | 130 g/l |
| Triethylene glycol monobutyl ether (TGB) | 40 g/l |
| Diethylene glycol monobutyl ether (DBG) | 100 g/l |
| Diethylene glycol monoethyl ether (DGE) | 6.9 g/l |
| 1-Methoxy-2-propanol (MFG) | 100 g/l |
| Triethanolamine (TEA) | 6.9 g/l |
| SURFINOL STG (SW) | 10 g/l |

In a similar manner to the above-described method except that the kind of a dye or additive was changed, magenta ink, light cyan ink, cyan ink, yellow ink, dark yellow ink, and black ink were prepared to form Ink Set 101 as shown in Table 14.

TABLE 14

| Component (g/l) | Light cyan | Cyan | Light magenta | Magenta | Yellow | Dark yellow | Black |
|---|---|---|---|---|---|---|---|
| Dye A-1 | | | | | | 5.0 | |
| Dye A-2 | 17.5 | 68.0 | | | | 13.0 | |
| Dye a-36 | | | 7.5 | 23.0 | | | |
| Dye A-3 | | | | | 14.0 | 10.0 | |
| Dye A-4 | | | | | 14.0 | 10.0 | |
| Dye A-5 | | | | | | | 20.0 |
| Dye A-6 | | | | | | | 20.0 |
| Dye A-7 | | | | | | | 39.0 |
| Dye A-8 | | | | | | | 17.0 |
| BTZ | 0.07 | 0.07 | 0.08 | 0.08 | 0.08 | 0.08 | 0.08 |
| PROXEL | 1.0 | 1.0 | 3.5 | 3.5 | 3.0 | 5.0 | 4.0 |
| DEG | 30 | 30 | 20 | 20 | 20 | 20 | 20 |
| GR | 164 | 164 | 130 | 130 | 154 | 147 | 120 |
| TGB | 40 | 40 | 40 | 40 | 40 | 40 | 40 |

TABLE 14-continued

| Component (g/l) | Light cyan | Cyan | Light magenta | Magenta | Yellow | Dark yellow | Black |
|---|---|---|---|---|---|---|---|
| DGB | 100 | 100 | 100 | 100 | 100 | 100 | 100 |
| DBE | 6.9 | 6.9 | 6.9 | 6.9 | 6.9 | 6.9 | 6.9 |
| 2-Pyrrolidone | — | 20 | — | — | — | — | 20 |
| MFG | 100 | 100 | 100 | 100 | 100 | 100 | 100 |
| TEA | 6.5 | 6.5 | 6.9 | 6.9 | 1.0 | 1.0 | 18 |
| SW | 10 | 10 | 10 | 10 | 3.0 | 3.0 | 5.0 |
| Final amount* | 1 liter | 1 liter | 1 liter | 1 liter | 1 liter | 1 liter | 1 liter |
| D** | 8.3 | 8.3 | 7.3 | 7.3 | 6.8 | 6.8 | 8.5 |

(Note):
Except the columns attached with * and **, the unit is g/liter.
*The final amount was adjusted to 1 liter by the addition of water.
**Solvent concentration (wt. %) at which the solubility at 25° C. of the dye (a-36) is 10 (g/100 g) or greater.

With regards to abbreviations BTZ, PROXEL, DEG, GR, TGB, TEA, SW, DGB, DGE and MFG in Table, refer to the formulation of light magenta ink LM-101. DEG stands for diethylene glycol.

Four solvents, that is, TGB, DGE, TEA and DEG permit the dye (a-26) to have a solubility, at 25° C., of 10 (g/100 g) or greater.

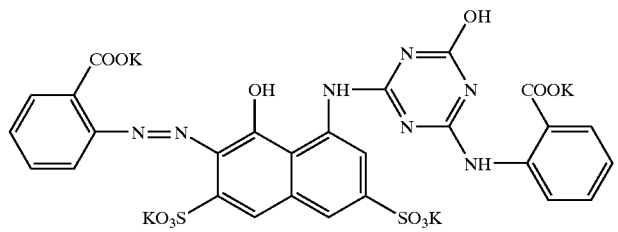

A-1

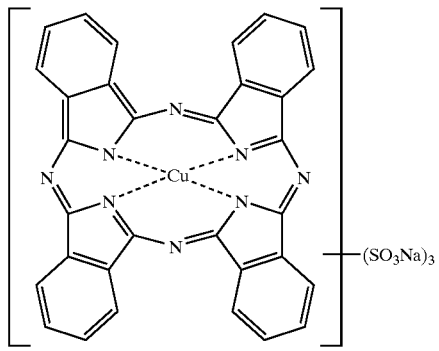

A-2

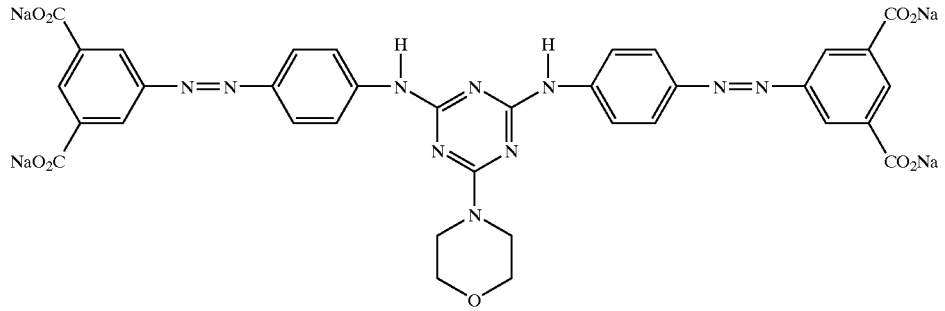

A-3

-continued

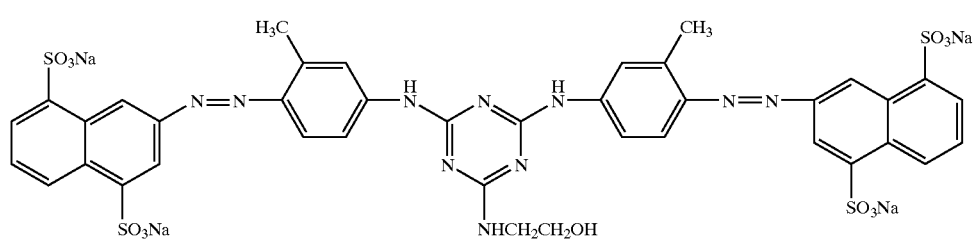
A-4

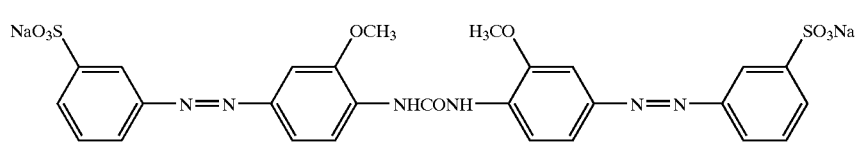
A-5

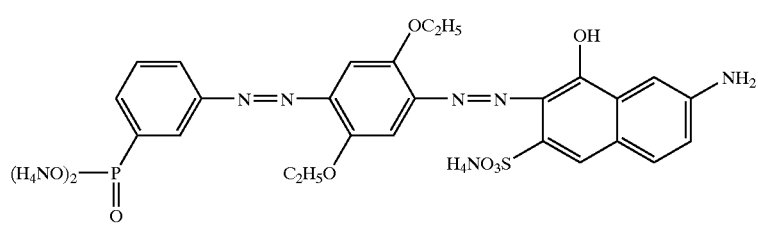
A-6

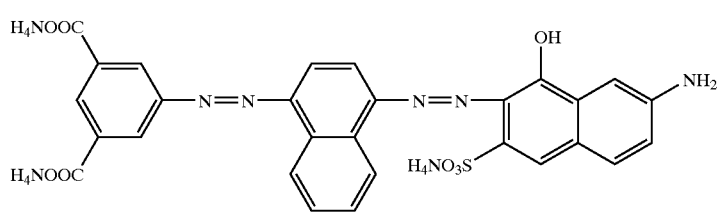
A-7

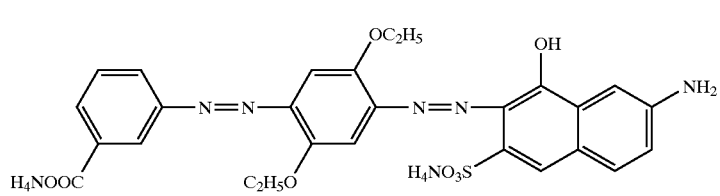
A-8

Of the dyes used in this Example, the magenta colorant (a-36) has the greatest solubility in a water miscible organic solvent. Four water miscible organic solvents, that is, triethylene glycol monobutyl ether (TGB), triethanolamine (TEA), diethylene glycol monoethyl ether (DBG) and diethylene glycol (DEG) permit the dye to have a solubility, at 25° C., of 10 (g/100 g) or greater.

The Ink set 101 was then filled in the cartridge of "Ink Jet Printer PM920C" (trade name; product of EPSON) and by this printer, an image was printed on photo-quality inkjet glossy paper EX manufactured by Fuji Photo Film. Color bleeding was evaluated as described below.

(Evaluation Test)

Under high humidity conditions, bleeding of the image was evaluated. Printing patterns like a grid having four 3 cm×3 cm square columns, any two adjacent squares being apart by a 1 mm white background space, were formed for yellow, cyan, magenta and black colors which are primary colors, blue, red, and green colors which are secondary colors, and gray color which is a tertiary color. After the image pattern sample was allowed to stand for 72 hours under the conditions of 25° C. and 90% RH, the bleeding of the magenta dye to the white background space portion was observed. When an increase of the magenta density compared with the magenta density just after printing, each measured by Status A green filter light, was 0.01 or less, 0.01 to 0.05, and 0.05 or greater, it was ranked as A, B and C, respectively.

Ink set 102 was then prepared by changing the amount of the water miscible organic solvent in each ink constituting Ink set 101.

TABLE 15

| Component (g/l) | Light cyan | Cyan | Light magenta | Magenta | Yellow | Dark yellow | Black |
|---|---|---|---|---|---|---|---|
| Dye A-1 | | | | | | 5.0 | |
| Dye A-2 | 17.5 | 68.0 | | | | 13.0 | |
| Dye a-36 | | | 7.5 | 23.0 | | | |
| Dye A-3 | | | | | 14.0 | 10.0 | |
| Dye A-4 | | | | | 14.0 | 10.0 | |
| Dye A-5 | | | | | | | 20.0 |
| Dye A-6 | | | | | | | 20.0 |
| Dye A-7 | | | | | | | 39.0 |
| Dye A-8 | | | | | | | 17.0 |
| BTZ | 0.07 | 0.07 | 0.08 | 0.08 | 0.08 | 0.08 | 0.08 |
| PROXEL | 1.0 | 1.0 | 3.5 | 3.5 | 3.0 | 5.0 | 4.0 |
| DEG | 30 | 130 | 100 | 100 | 20 | 50 | 20 |
| GR | 164 | 164 | — | — | 154 | 147 | 120 |
| TGB | 132 | 164 | 130 | 164 | 130 | 127 | 120 |
| DGB | — | — | — | — | — | — | — |
| DGE | — | — | — | 50 | — | — | 40 |
| 2-Pyrrolidone | — | 20 | — | — | — | — | 80 |
| MFG | — | — | — | — | — | — | — |
| TEA | 6.5 | 6.5 | 6.9 | 6.9 | 1.0 | 1.0 | 18 |
| SW | 10 | 10 | 10 | 10 | 3.0 | 3.0 | 5.0 |
| Final amount* | 1 liter | 1 liter | 1 liter | 1 liter | 1 liter | 1 liter | 1 liter |
| D ** | 16.9 | 30.1 | 23.7 | 32.1 | 15.1 | 17.8 | 19.8 |

(Note):
Meanings of the abbreviation standing for the components and unit of numerals are similar to those in Table 14.

[Preparation of Comparative Example Sample]

An ink set for comparison as described below was prepared by changing a portion of the constituent inks of Ink set 101 used in Example 1 with the constituents inks of Ink set 102 as described in Table 15.

Comparative Example 1

In a similar manner to that employed for Example 1 except that the light magenta ink and magenta ink of Ink set 101 were replaced with the light magenta ink and magenta ink of Ink set 102, grid-like printing patterns were printed and bleeding was evaluated.

Comparative Example 2

In a similar manner to Example 1 except that the cyan ink of Ink set 101 was replaced with the cyan ink of Ink set 102, grid-like printing patterns were printed and bleeding was evaluated.

Comparative Example 3

In a similar manner to Example 1 except that the yellow ink of Ink set 101 was replaced with the yellow ink of Ink set 102, grid-like printing patterns were printed and bleeding was evaluated.

Comparative Example 4

In a similar manner to Example 1 except that the yellow ink, light cyan ink and cyan ink of Ink set 101 were replaced with the yellow ink, light cyan ink and cyan ink of Ink set 102, grid-like printing patterns were printed and bleeding was evaluated.

Comparative Example 5

In a similar manner to Example 1 except that the all the inks of Ink set 101 except the light magenta ink and magenta ink were replaced with the corresponding inks of the ink set 102, grid-like printing patterns were printed and bleeding was evaluated.

TABLE 16

| Ink set | Bleeding of primary color | Bleeding of secondary color | Bleeding of tertiary color, gray |
|---|---|---|---|
| Example 1 | A | A | A |
| Comparative Example 1 | C(magenta)*** | C(red, blue) | B |
| Comparative Example 2 | A | B(blue) | B |
| Comparative Example 3 | A | B(red) | B |
| Comparative Example 4 | A | C(red, blue) | B |
| Comparative Example 5 | A | C(red, blue) | C |

***Bleeding of the color in parenthesis occurred.

As is apparent from Table 16, the ink set of the invention in which the amount of a water miscible organic solvent permitting the dye to have a solubility of 10 (g/100 g) or greater has been limited is free from bleeding of not only a single color, but also secondary and tertiary colors even after the passage of time under highly humid conditions and it provides excellent image quality. On the other hand, bleeding of at least one of the primary colors, secondary colors and tertiary color occurred in the ink sets of Comparative Examples 1 to 5 containing a constituent ink in which a water miscible organic solvent permitting the dye to have a solubility of 10 (g/100 g) greater is incorporated in an amount exceeding 10 wt. %. This suggests that the ink set of the invention which has inks each limited in the amount of a water miscible organic solvent permitting high dissolution of a dye therein is superior.

It has been recognized that even when the image receiving paper was replaced with PM photographic paper of Epson or PR101 of Canon, substantially similar effects were available.

The inkjet recording ink set of the invention which does not contain a water miscible organic solvent permitting the dye in the ink set to have a solubility of 10 (g/100 g) or greater, or, if any, contains it in an amount of 10 wt. % or less, in total, of each ink composition constituting the ink set causes less color bleeding in either single color drawing or multicolor (secondary color, tertiary color) drawing; and provides an inkjet image of excellent quality. In particular, when the ink set contains a predetermined azo dye represented by the formula (1), that is, having a 6-membered heterocycle bonded to a diazo group, the above-described effect is marked.

This application is based on Japanese Patent application JP 2002-101621, filed Apr. 3, 2002, the entire content of which is hereby incorporated by reference, the same as if set forth at length.

What is claimed is:

1. An ink set comprising a plurality of inks each comprising at least a water soluble dye, a water miscible organic solvent and water, wherein:
   (1) each of the water miscible organic solvents permits all of the dyes to have a solubility at 25° C. of less than 10 (g/100 g); or
   (2) at least one of the water miscible organic solvents permits at least one of the dyes to have a solubility at 25° C. of 10 (g/100 g) or greater, but a total amount of the at least one of the water miscible organic solvents is 10% by weight or less based on each one of the inks; and
   (3) at least one of the water soluble dyes is a magenta dye represented by the following formula (1):

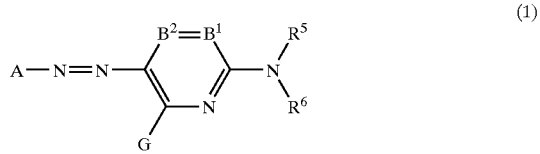

(1)

wherein, A represents a 5-membered heterocyclic group; $B^1$ and $B^2$ each represents =$CR^1$— or —$CR^2$=, or one of $B^1$ and $B^2$ represents a nitrogen atom and the other represents =$CR^1$— or —$CR^2$=; $R^5$ and $R^6$ each independently represents a hydrogen atom or a substituent, the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and a hydrogen atom of each of the substituents may be substituted; and G, $R^1$, and $R^2$ each independently represents a hydrogen atom or a substituent, the substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and a hydrogen atom of each of the substituents may be substituted; and $R^1$ and $R^5$, or $R^5$ and $R^6$ may be coupled to form a 5- or 6-membered ring.

2. An inkjet recording method using the ink set according to claim 1.

3. The ink set according to claim 1, wherein at least one of the dyes has a structure represented by the following formula (2):

Het-N=N-Het (2)

wherein Het is a heterocyclic group.

4. The ink set according to claim 1, wherein at least one of the dyes has a structure represented by the following formula (3):

D-N=N-E (3)

wherein D is a 5-membered heterocyclic group and E is a 6 membered heterocyclic group.

5. The ink set according to claim 1, wherein at least two of the water miscible organic solvents permit at least one of the water soluble dyes to have a solubility at 25° C. of 10 (g/100 g) or greater.

6. The ink set according to claim 1, wherein the plurality of inks comprises at least yellow, magenta and cyan inks.

7. The ink set according to claim 1, wherein the plurality of inks comprises at least yellow, magenta, cyan, and black inks.

8. The ink set according to claim 1, wherein the plurality of inks comprises at least yellow, dark yellow, magenta, light magenta, cyan, light cyan, and black inks.

9. The ink set according to claim 1, wherein at least one of A, $R^1$, $R^2$, $R^5$, $R^6$ and G, in the water soluble dye of formula (1) has, as a further substituent, an ionic hydrophilic group.

10. The ink set according to claim 9, wherein the ionic hydrophilic group is a sulfo group, a carboxyl group, a phosphono group, or a quaternary ammonium group.

* * * * *